United States Patent
Lou

(10) Patent No.: US 7,281,023 B2
(45) Date of Patent: Oct. 9, 2007

(54) ARCHITECTURE OF DATABASE APPLICATION WITH ROBUST ONLINE RECOVERABILITY

(75) Inventor: Yongming Lou, Kansas City, MO (US)

(73) Assignee: AT&T Knowledge Ventures, L.P., Reno, NV (US)

(*) Notice: Subject to any disclaimer, the term of this patent is extended or adjusted under 35 U.S.C. 154(b) by 511 days.

(21) Appl. No.: 10/734,112

(22) Filed: Dec. 15, 2003

(65) Prior Publication Data
US 2005/0131966 A1   Jun. 16, 2005

(51) Int. Cl.
G06F 17/30 (2006.01)

(52) U.S. Cl. .................. 707/200; 707/202; 707/203; 707/204; 707/205

(58) Field of Classification Search ............... None
See application file for complete search history.

(56) References Cited

U.S. PATENT DOCUMENTS

| | | | |
|---|---|---|---|
| 5,301,319 A | 4/1994 | Thurman et al. | |
| 5,369,757 A | 11/1994 | Spiro et al. | |
| 5,414,840 A | 5/1995 | Rengarajan et al. | |
| 5,581,750 A | 12/1996 | Haderle et al. | |
| 5,682,527 A | 10/1997 | Cooper et al. | |
| 5,712,971 A | 1/1998 | Stanfill et al. | |
| 5,758,150 A | 5/1998 | Bell et al. | |
| 5,799,323 A | 8/1998 | Mosher, Jr. et al. | |
| 5,864,849 A | 1/1999 | Bohannon et al. | |
| 5,870,759 A | 2/1999 | Bauer et al. | |
| 5,870,763 A | 2/1999 | Lomet | |
| 5,884,312 A * | 3/1999 | Dustan et al. | 707/10 |
| 5,884,324 A | 3/1999 | Cheng et al. | |
| 5,890,154 A | 3/1999 | Hsiao et al. | |
| 5,907,849 A | 5/1999 | Dias et al. | |
| 5,931,955 A | 8/1999 | Kung | |
| 5,933,838 A | 8/1999 | Lomet | |
| 5,946,698 A | 8/1999 | Lomet | |
| 5,974,425 A | 10/1999 | Obermarck et al. | |
| 6,065,018 A | 5/2000 | Beier et al. | |
| 6,078,932 A | 6/2000 | Haye et al. | |
| 6,151,607 A | 11/2000 | Lomet | |

(Continued)

OTHER PUBLICATIONS

Oracle9i Database Daily Feature, Oracle9i Flashback Query, <http://technet.oracle.com/products/oracle9i/daily/Aug13.html>, printed on Aug. 28, 2003.

*Primary Examiner*—Jeffrey Gaffin
*Assistant Examiner*—Tomasz Ponikiewski
(74) *Attorney, Agent, or Firm*—Greenblum & Bernstein, P.L.C.

(57) ABSTRACT

An architecture for efficiently identifying the scope and timeframe of database errors, providing online history images, creating online point-in-time views of application tables, reconstructing equivalent SQL statements of a committed transaction or of a user session, providing a selective audit trail report on demand, and permitting selective online rollbacks in an application database. The rollback can be done on a single row, a single transaction, a group transactions, a user session, or all user tables. The system includes after images tables and before images tables and tracks all before images of user application tables when a user performs an INSERT, UPDATE, or DELETE operation with respect to a row in a table. Also, the system is provided to generate history images of application tables at a point-in-time, and to selectively rollback, or undo whole or a portion of application tables, to generate a selective audit trail report on demand, and to manage the before images.

8 Claims, 18 Drawing Sheets

U.S. PATENT DOCUMENTS

| | | |
|---|---|---|
| 6,163,856 A | 12/2000 | Dion et al. |
| 6,185,577 B1 | 2/2001 | Nainani et al. |
| 6,253,211 B1 | 6/2001 | Gillies et al. |
| 6,275,824 B1 | 8/2001 | O'Flaherty et al. |
| 6,295,610 B1 | 9/2001 | Ganesh et al. |
| 6,324,548 B1 | 11/2001 | Sorenson |
| 6,397,227 B1 * | 5/2002 | Klein et al. ............ 707/200 |
| 6,421,686 B1 | 7/2002 | Martin, Jr. |
| 6,430,577 B1 | 8/2002 | Hart |
| 6,449,623 B1 | 9/2002 | Bohannon et al. |
| 6,453,325 B1 | 9/2002 | Cabrera et al. |
| 6,539,402 B1 | 3/2003 | Sorenson et al. |
| 2002/0007363 A1 | 1/2002 | Vaitzblit |
| 2002/0107876 A1 | 8/2002 | Tsuchida et al. |
| 2002/0116404 A1 | 8/2002 | Cha et al. |

* cited by examiner

ARCHITECTURE OF DATABASE APPLICATION WITH ROBUST ONLINE RECOVERABILITY

FIELD OF THE INVENTION

The present invention relates to databases, and more specifically, to a method and system of providing online history images, creating online point-in-time views of application tables, reconstructing equivalent SQL statements of a committed transaction, providing a selective audit trail report on demand, and selectively performing an online rollback in an application database.

BACKGROUND AND MATERIAL INFORMATION

In typical database systems, end users store, update and retrieve information by submitting commands to a database application. For instance, the commands may be submitted in the ubiquitous structured query language (SQL). Unfortunately, most if not all database systems are susceptible to hardware or system failures that can result in a loss of data or a corruption of data. Moreover, it is well known that user errors or application errors create more database logical errors than do hardware and system failures. Unlike physical errors created by hardware or system failures, logical errors created by users and/or applications are more difficult to detect, harder to identify in scope, and generally require more time and resources to resolve.

Most database vendors provide methods to recover a database when a hardware failure or system failure occurs. That is, the entire database can be recovered to a state that existed at a specified time in the past. However, most database vendors do not provide a method of directly rollbacking a selected portion of the database. In most cases, after identifying the errors and the scope of the errors, a database administrator has to manually rollback a selected portion of data to a specified time in a primary database with the help of a secondary database built to the specified time. The second database will then use a transaction log from the primary database to move forward to the specified time. The set up time for a secondary database is very time consuming, and for each specified time, one needs to set up a secondary database. Furthermore, if the database administrator decides to move back farther in time, then the database administrator must set up another secondary database from the backup copy and move forward to the new specified time. After the selective rollback, the database administrator must also perform additional administrative tasks to bring the application data to a logical consistent state.

Oracle provides a method of querying data at a point-in-time (Flashback Query, Oracle9i Application Developer's Guide—Fundamentals, p. 7-43). The Flashback Query allows the selective rollback of a portion of a database with some limitations. For instance, one limitation is that the undo space of the database needs to be managed by an automatic undo management to use this feature effectively. The undo segment consumes a lot more disk space than the related data rows do in their related tablespaces. Thus, the availability of the storage capacity will limit how far back in the time the Flashback can query the database. Another limitation is that the specified period of time (i.e., undo retention period) in which the Flashback can query back into the past is the same for all of the tables. Specifically, Oracle uses a single initialization parameter (i.e., UNDO_RETENTION) to control how far into the past a user may query the database. Moreover, the user does not have a choice of assigning a different undo retention period for each different table. Further, unimportant tables may use a lot more of the undo segment space than do the more important tables. When the undo space is full, some unexpired undo spaces will be reused such that the data related to the reused undo space can not be flashbacked to the retention time.

An additional limitation that exists with the prior art system is that a database administrator is not able to obtain a precise flashback. Essentially, the time specified in DBMS_FLASHBACK.ENABLE_AT_TIME statement or in an AS OF TIMESTAMP clause is mapped to a system commit number (SCN), which serves as the basis for flashback queries. Thus, flashback query results are based on the SCN. The database tracks and records the SCN at five minute intervals after database startup, and logs the information for the five most recent days of operation. Any timestamp used in the Flashback query may be rounded down by up to five minutes. The Flashback is not available for a newly created table for up to five minutes. Further, since the database logs the information for only the five most recent days of operation, the user needs to keep track of the SCNs (or otherwise determine the SCNs) if the user wants to flashback by more than five days. Despite doing so, the undo data may be overwritten, in which case the Flashback query will result in an error.

Another limitation is that some structure changes of a table, like the drop/modify column of the table will invalidate the undo data. Therefore, the user cannot query data earlier than the time the table was changed. Still another limitation is that the user cannot Flashback a remote table through a database link. An additional limitation is that the performance of a flashback query depends on how much data needs to be recreated, which is an expensive process. Another limitation is that the change history of a row is not easy to obtain through the Flashback query. That is, the Flashback provides one view at a specific time, as opposed to a continuous view.

Thus, it would be advantageous to quickly and efficiently identify the scope and timeframe of a database application error in order to reduce the mean time to repair and the database downtime. Furthermore, it would be desirable to provide online history images, create online point-in-time views of application tables, reconstruct the equivalent SQL statements of a committed transaction, provide a selective audit trail report on demand, and permit selective online rollbacks a single row, a single transaction, a user session, or all user tables in an application database.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which.

DETAILED DESCRIPTION OF EMBODIMENTS

Figure 1:
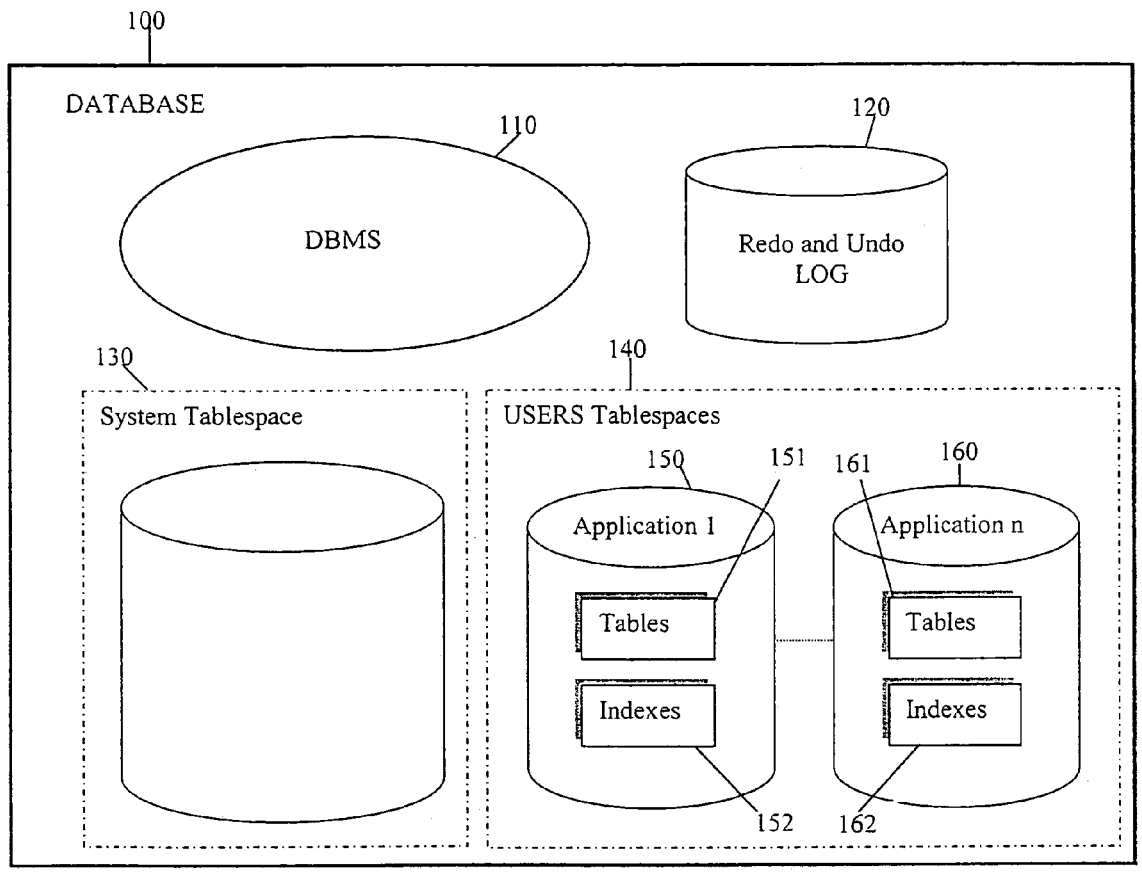
FIG. 1 is a block diagram of a prior art database application.

The present invention relates to efficiently identifying the scope and timeframe of database errors, providing online history images, creating online point-in-time views of application tables, reconstructing the equivalent SQL statements of a committed transaction, providing a selective audit trail report on demand, and permitting selective online rollbacks in an application database. The rollback can be done on a single row, a single transaction, a group transactions, a user session, or all user tables.

In view of the above, the present invention through one or more of its various aspects and/or embodiments is presented to accomplish one or more objectives and advantages, such as those noted below.

According to one aspect of the present invention, a method is provided for creating an online point-in-time view of an application table of an active database that has at least one before image table and at least one after image table. Initially, the method includes retrieving a retention time of the application table and making a determination that a particular point-in-time is greater than or equal to the retention time. The method further includes creating the point-in-time view of the application table. The view includes a union of a set of rows from the after image table having a timestamp less than or equal to the point-in-time and a set of rows from the before image table having a timestamp less than or equal to the point-in-time and having a changing timestamp greater than the point-in-time.

According to another aspect of the present invention, a method is provided for creating an online point-in-time view of an application table of an active database that has at least one before image table and at least one after image table. Initially, the method includes retrieving a transaction id set associated with a transaction id that begins before or at a point-in-time and ends after the point-in-time, retrieving a retention time of the application table, and making a determination that the point-in-time is greater than or equal to the retention time. The method further includes creating the point-in-time view of the application table. The view includes a union of a set of rows from the after image table having a timestamp that is less than or equal to the point-in-time and having a transaction id that is not a proper subset of the transaction id set, and a set of rows from the before image table having a timestamp less than or equal to the point-in-time, and having a transaction id that is not a proper subset of the transaction id set, and having a changing transaction id that is a proper subset of the transaction id set or having a changing timestamp that is greater than the point-in-time.

According to another aspect of the present invention, a method is provided for rollbacking at least one table of an active database to a point-in-time, in which the database has at least one before image table and at least one after image table. The method includes retrieving a retention time for each of the at least one table, determining that none of the retention times for the at least one table is greater than the point-in-time, locking all tables to be rollbacked, and disabling all related integrity constraints. Then, rows are deleted from each of the at least one after image table that have a timestamp greater than the point-in-time. The method further includes inserting into each of the at least one after image table, rows from the associated before image table having a timestamp less than or equal to the point-in-time and having a changing timestamp greater than the point-in-time. Lastly, all related integrity constraints are enabled.

According to another aspect of the present invention, a method is provided for rollbacking at least one table of an active database to a point-in-time, in which the database has at least one before image table and at least one after image table. The method includes retrieving a retention time for each of the at least one table, determining that none of the retention times for each of the at least one table is greater than the point-in-time, retrieving a transaction id set associated with a transaction id that begins before or at the point-in-time and ends after the point-in-time, locking all tables to be rollbacked, and disabling all related integrity constraints. Further, the method includes deleting rows from each of the at least one after image table having a timestamp greater than the point-in-time or having a transaction id that is a proper subset of the transaction id set. The method also includes inserting into each of the at least one after image table, rows from the associated before image table having a timestamp less than or equal to the point-in-time and having a transaction id that is not a proper subset of the transaction id set, and having a changing transaction id that is a proper subset of the transaction id set or having a changing timestamp that is greater than the point-in-time. Lastly, all related integrity constraints are enabled.

Another aspect of the present invention is to provide a method of rollbacking selected rows in a table of an active database to a point-in-time, in which the database has at least one before image table and at least one after image table. The method includes retrieving a retention time of the table, determining that the point-in-time is greater than or equal to the retention time, locking the table to be rollbacked, and disabling all related integrity constraints. The method further includes deleting selected rows from the after image table having a timestamp greater than the point-in-time, and inserting into the after image table, selected rows from the before image table having a timestamp less than or equal to the point-in-time and having a changing timestamp that is greater than the point-in-time. Then, all related integrity constraints are enabled.

According to another aspect of the present invention, a method is provided for rollbacking selected rows in a table of an active database to a point-in-time, in which the database has at least one before image table and at least one after image table. The method includes retrieving a transaction id set associated with a transaction id that begins before or at the point-in-time and ends after the point-in-time, retrieving a retention time of the table, determining that the point-in-time time is greater than or equal to the retention time, locking the table to be rollbacked, and disabling all related integrity constraints. The method further includes deleting selected rows from the after image table having a timestamp greater than the point-in-time or having a transaction id that is a member of the transaction id set. Still further, the method includes inserting into the after image table, selected rows from the before image table having a timestamp that is less than or equal to the point-in-time and having a transaction id that is not a proper subset of the transaction id set, and having a changing transaction id that is a proper subset of the transaction id set or having a changing timestamp that is greater than the point-in-time. Lastly, all related integrity constraints are enabled.

According to another aspect of the present invention, a method is provided for obtaining a history of a single data row of a table of an active database, in which the database has at least one before image table and at least one after image table. The method includes retrieving a data row set comprising the union of zero or one selected row from the after image table and zero or more selected deleted rows from the before image table, determining that the data row set is not empty, and recursively finding all associated parent rows for each data row in the data row set. The finding may further include recursively finding all rows having a changing timestamp that equals a previous row's timestamp, in which the previous row is associated with the rows. The finding may further include recursively finding all rows having a changing timestamp and a changing transaction id that equals a previous row's timestamp and transaction id, in which the previous row is associated with the rows.

According to another aspect of the present invention, a method is provided for rollbacking a transaction id set in a group of tables of an active database, in which the database has at least one before image table and at least one after image table. The method includes retrieving an earliest starting time of the transaction id set, retrieving a latest retention time for all of the tables, determining that the earliest starting time is greater than the latest retention time, locking all tables to be rollbacked, and disabling all related integrity constraints. Then, the method includes rollbacking the transaction id set in the group of tables and enabling all related integrity constraints. The method may further include deleting rows from the after image table having a transaction id that is a member of the transaction id set, selecting earliest before image rows from the before image table having a transaction id that is a proper subset of the transaction id set, or having a changing transaction id that is a proper subset of the transaction id set, having an earliest timestamp, deleting any after image of a row from the after image table when a transaction id of the row is a proper subset of the transaction id set and a changing transaction id of the row is not equal to a current transaction id, and deleting any after image of a row from the after image table and inserting a before image from the row into the after image table when the transaction id of the row is not a proper subset of the transaction id set and the changing transaction id is a proper subset of the transaction id set. The method may further include deleting rows from the after image table having a transaction id that is a member of the transaction id set, selecting before image rows and any descendants from the before image table having a transaction id that is a proper subset of the transaction id set or having a changing transaction id that is a proper subset of the transaction id set, grouping the selected rows into families, removing any families having an earliest transaction id that is a proper subset of the transaction id set, inserting an earliest returned before image in a family into the after image table when the last changing transaction id of the family is equal to a current transaction id, and inserting an earliest returned before image in a family into the after image table when the last changing transaction id of the family is a proper subset of the transaction id set and if no after image of the family exists.

Another aspect of the present invention is to provide a method for rollbacking all transactions made in a user session of an active database. The method includes retrieving selected parameters associated with the user session, and retrieving names of the tables used by a user and transaction ids made by the user during a session, in which the session is defined by a user login time and logout time. Further, the method includes retrieving an earliest starting time of the transaction id set, retrieving a latest retention time for all of the tables, determining that the earliest starting time is greater than the latest retention time, and rollbacking the transaction set from the tables.

According to another aspect of the present invention, a system is provided for use with an active database for performing at least one of online selectively rollbacking at least one application table or selected application data in at least one table, creating online point-in-time views of application tables, providing online history images associated with the database, reconstructing equivalent SQL statements of a committed transaction, reconstructing equivalent SQL statements of a user session, and providing a selective audit trail report on demand. The system includes multiple user application after image tables, in which each of the tables has one before image table to store before images, and one after image view. The table is provided that includes a table having a table name field, a retention time field, and an export timestamp field. Further, an image manager is included that creates image views and a rollback manager is provided to manage the first table.

The system may also include a second table that contains fields associated with a user session. Further, the system may include a third table that has fields associated with a transaction id, starting timestamp, and ending timestamp. The image manager further include an inserting trigger that sets parameters for an inserted row in the after image tables, an updating trigger that inserts an original row into a before image table and sets parameters associated with the changed row in the after image tables and the before image tables, and a deleting trigger that inserts the original row into the before image table and sets parameters associated with the changed row in the before image tables. A transaction trigger may be provided that records each transaction id and a login/logout trigger may be provided that records a time when a user enters or exits the database. The after image tables may also include at least one of a timestamp field, user id field, and transaction id field. Further, the rollback manager performs at least one of rollbacking at least one table to a point-in-time, rollbacking selected rows in a single table to a point-in-time, rollbacking a transaction id set in a group of tables, rollbacking all transactions made in a user session, reconstructing equivalent SQL statements of a transaction id set in a group of tables, reconstructing equivalent SQL statements of a user session in a group of tables, and providing a selective audit trail report on demand.

Another aspect of the present invention is to provide a computer readable medium that contains instructions for implementing application tables in a database and tracking images. The instructions include executable instructions for implementing at least one after image table that stores current database images; and a before image table associated with each of the at least one after image table that stores previous images of the current database images. The at least one after image table and the before image table are available for online viewing.

Further, each of the after image tables may include at least one of a timestamp field, a userid field, and a transaction id field. Still further, each of the before image tables includes at least one of a changing timestamp field, a changing userid field, a changing transaction id field, and an opcode. Yet further, each of the before image tables further include a field associated with a field in the associated after image table.

According to another aspect of the present invention, a method is provided for reconstructing equivalent SQL statements of a transaction id set in a group of tables of an active database, in which the database has at least one before image table and at least one after image table. The method includes retrieving an earliest starting time of the transaction id set, retrieving a latest retention time for all related tables, and making a determination that the earliest starting time is greater than the latest retention time. A delete SQL statement is created for each deleted row in each of the before image tables having a changing transaction id that is a proper subset of the transaction id set. An update SQL statement is created using the after image in one of the after image table or the before image table associated thereof by the relation that the timestamp and transaction id of an associated child row are equal to a changing timestamp and changing transaction id of an associated parent row, respectively, for each updated row in each of the before image tables having a changing transaction id that is a proper subset of the transaction id set. An insert SQL statement is created for each row in each of the before image tables having a transaction id that is a proper subset of the transaction id set and an associated timestamp and transaction id do not exist in the before image as the changing timestamp, changing transaction id. An insert SQL statement is created for each row in each of the after image tables having a transaction id that is a proper subset of the transaction id set and an associated timestamp and transaction id do not exist in the before image as the changing timestamp, changing transaction id.

According to another aspect of the present invention, a method is provided for reconstructing equivalent SQL statements of a transaction id set in a group of tables of an active database, in which the database has at least one before image table and at least one after image table. The method includes retrieving an earliest starting time of the transaction id set, retrieving a latest retention time for all related tables, and determining that the earliest starting time is greater than the latest retention time. A delete SQL statement is created for each deleted row in each of the before image tables having a changing transaction id that is a proper subset of the transaction id set. An update SQL statement is created using an after image of an associated child row in one of the after image table or the before image table for each updated row in each of the before image tables having a changing transaction id that is a proper subset of the transaction id set. An insert SQL statement is created for each row without an associated parent row in the each of the before and after image tables having a transaction id that is a proper subset of the transaction id set.

According to another aspect of the present invention, a method is provided for reconstructing equivalent SQL statements of all transactions made in a user session of an active database. The method includes retrieving selected parameters associated with the user session and retrieving names of tables used by a user and transaction ids made by the user during the session, in which the session is defined by a user login time and a user logout time. The method further includes retrieving an earliest starting time of the transaction id set, retrieving a latest retention time for all of the tables, determining that the earliest starting time is greater than the latest retention time, and reconstructing equivalent SQL statements of the transaction id set from the tables.

Another aspect of the present invention is to provide a method for reconstructing equivalent SQL statements of all transactions made in a user session of an active database, in which the database has at least one before image table and at least one after image table. The method includes retrieving selected parameters associated with the user session and retrieving names of tables used by a user during the session, in which the session is defined by a user login time and a user logout time. The method further includes retrieving a latest retention time for all of the tables; and determining that the login time is greater than the latest retention time. A delete SQL statement is created for each deleted row in the before image tables having a changing userid containing a user session id and a changing timestamp between the session starting timestamp and the session ending timestamp. An update SQL statement is created using an after image of an associated child row in one of the after image tables or the before image tables for each updated row in the before image tables having a changing userid containing the user session id and a changing timestamp between the session starting timestamp and the session ending timestamp. An insert SQL statement is created for each row without an associated parent row in each of the before and after image tables having a userid containing the user session id and a timestamp between the session starting timestamp and the session ending timestamp.

According to another aspect of the present invention, a method is provided for creating a selective audit trail report associated with activities of an application database user during a particular period, in which the activities include multiple database sessions. The method includes retrieving userids and unique session ids associated with the user during the period, retrieving names of any tables having any transactions made during the database sessions with one of retrieved unique session ids, retrieving an earliest start time of the sessions, retrieving a latest retention time for all of the tables whose names were retrieved, and making a determination that the starting time is greater than the latest retention time. The method further includes reconstructing equivalent SQL statements for all of the sessions, associating each reconstructed update and delete statement with an associated changing session id, changing timestamp, and changing userid, and adding the changing transaction id to the association if the database provides the user with transaction id tracking. Further, the method includes associating each reconstructed insert statement with an associated session id, timestamp, and userid, and adding the transaction id to the association if the database provides the user with transaction id tracking.

According to another aspect of the present invention, a method is provided for rollbacking transactions made in a user session in a group of tables of an active database, in which the database has at least one before image table and at least one after image table. The method includes retrieving a starting time, an ending time, a unique session id of the user session, retrieving a latest retention time for all of the tables, and making a determination that the starting time is greater than the latest retention time. Further, the method includes locking all tables to be rollbacked, disabling all related integrity constraints, rollbacking the transactions made in the user session in the group of tables, and enabling all related integrity constraints.

The unique session id may include a unique session id provided by a database vendor or may include a session id and the starting timestamp of the session. The method may further include deleting rows from the after image table having a unique session id that is equal to the user session's unique session id and selecting earliest before image rows, having an earliest timestamp, from the before image table having a unique session id that is equal to the user session's unique session id, or having a changing unique session id that is equal to the user session's unique session id. Further, the method may include deleting any after image of a row from the after image table if a unique session id of the row is equal to the user session's unique session id and a changing unique session id of the row is not equal to a current session's unique session id, or deleting any after image of a row from the after image table and inserting a before image from the row into the after image table if the unique session id of the row is not equal to the user session's unique session id set and the changing unique session id is equal to the user session's unique session id.

Further, the method may include deleting rows from the after image table having a unique session id that is equal to the user session's unique session id selecting before image rows and any descendants from the before image table having a unique session id that is equal to the user session's unique session id or having a changing unique session id that is equal to the user session's unique session id, grouping the selected rows into families, and removing any families having an earliest unique session id that is equal to the user session's unique session id. The method may further include inserting an earliest returned before image in a family into the after image table when the last changing unique session id of the family is equal to a current session's unique session id, or inserting an earliest returned before image in the family into the after image table when the last changing unique session id of the family is equal to the user session's unique session id and if no after image of the family exists.

FIG. 1 is a block diagram of a prior art database application. A database 100 includes a database management system (DBMS) 110, a redo and undo log 120, a system tablespace 130, and user tablespaces 140. The system tablespace 130 contains internal tables and indexes. The user tablespaces 140 contain application data 150 and 160, e.g., data files. Further, the application data also contains tables 151, 161 and indexes 152, 162. Read and write access to the system tablespace 130 and the user tablespaces 140 is controlled by a database administrator. In the event of a failure, the database 100 can be recovered from a backup copy of the database in conjunction with data files in the log 120.

Figure 2:
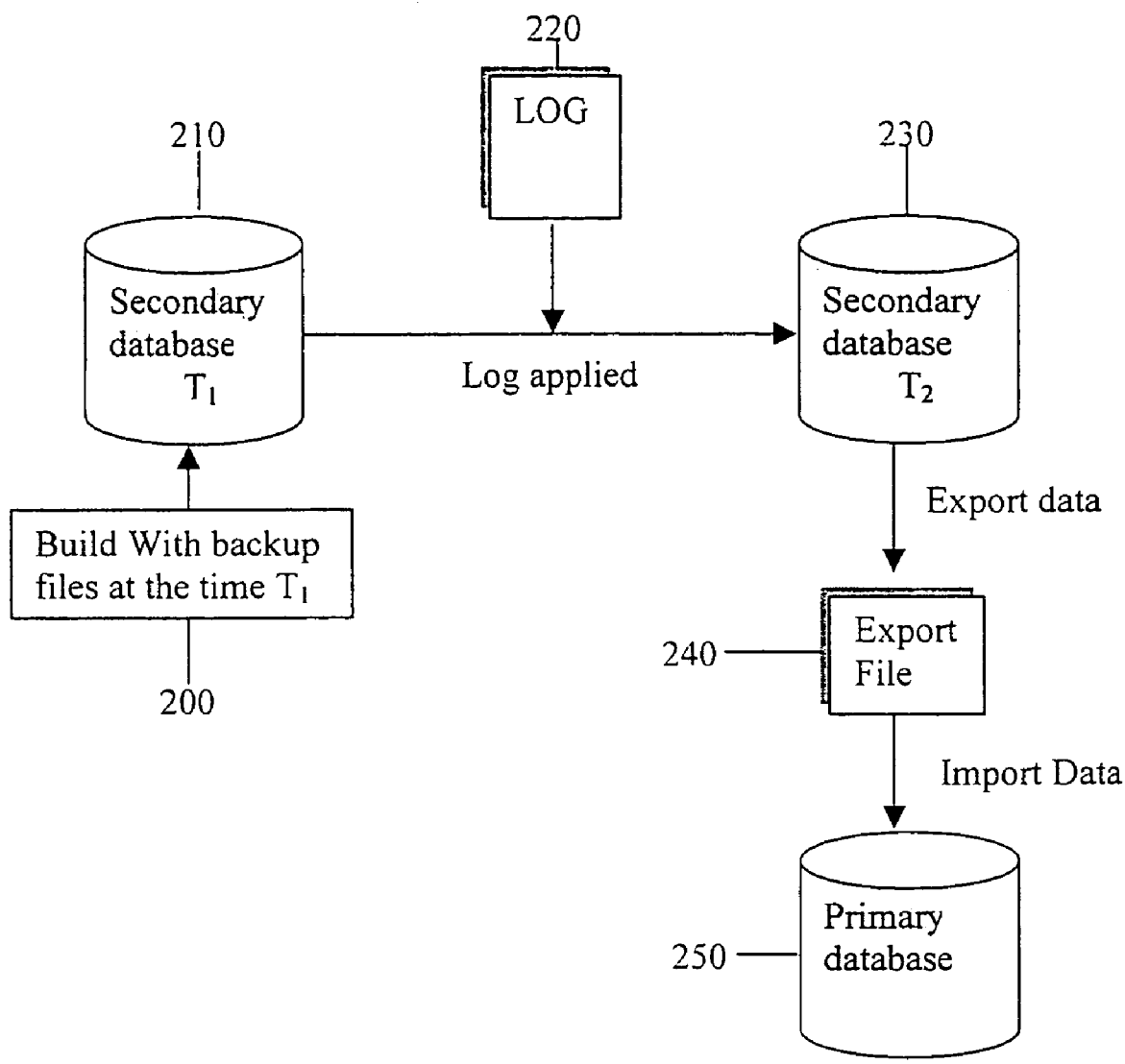
FIG. 2 is a block diagram illustrating a partial data point-in-time recovery, based on the prior art database application.

FIG. 2 is a block diagram of a partial data point-in-time recovery, based on the prior art database application. The application includes a complete backup copy at time $T_1$ 200, a secondary database at time $T_1$ 210, a log 220, a secondary database at time $T_2$ 230, an export file 240, and a primary database 250. In the illustrated example, the primary database 250 requires some partial data at a time $T_2$ in the past. Thus, using the complete backup copy 200 at the time $T_1$, a secondary database 210 is built. Then, the secondary database 210 is recovered forward to the time $T_2$ 230 using files in the log 220. Subsequently, the partial data is then exported to a dump file 240. Finally, the dump file 240 is imported into the primary database 250.

According to the present invention a timestamp field, userid and transaction_id field are added to each application table (i.e., after image table) to record the timestamp, userid and transaction id of the last insert, or update operation on a data row. Additionally, one before image table is created for each user application table. Each before image table includes a changing_timestamp, changing_userid, changing_transaction_id, and opcode field, in addition to the fields of its associated after image table. That is, the term changing used before the field name indicates that it pertains to the operation that moves a before image row from an after image table to the associated before image table. Further, as will be shown, systems are provided to track all before images of user application tables and to set up all new added fields when a user performs an INSERT, UPDATE, or DELETE operation with respect to a row in a table. Also, a system is provided to generate history images of application tables at a point-in-time, to reconstruct the equivalent SQL statements of a committed transaction, to selectively rollback or undo, an entire or a portion of at least one application table, and to manage the before images.

Figure 3:
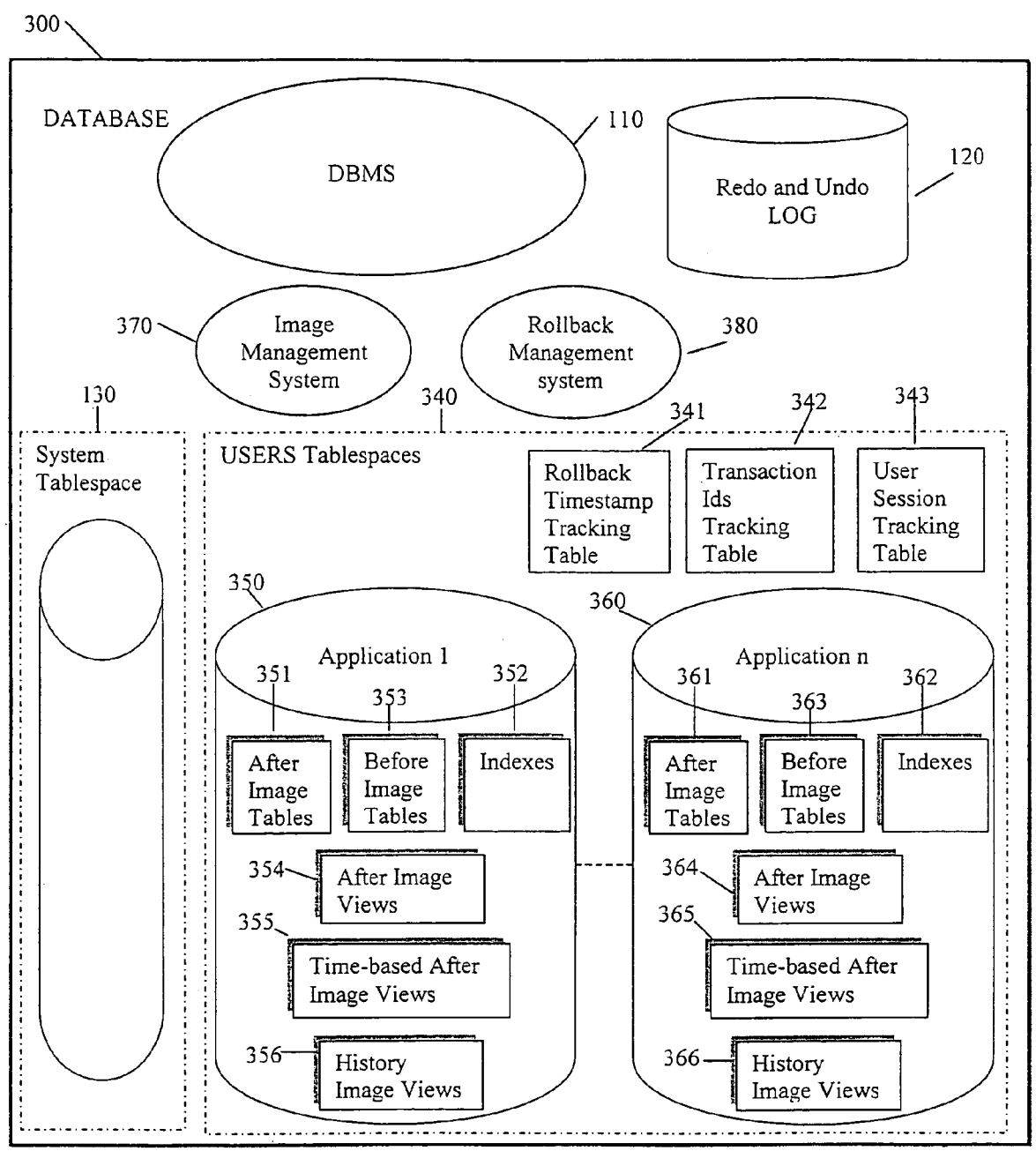
FIG. 3 is an exemplary block diagram of a database application architecture, according to an aspect of the present invention.

FIG. 3 is an exemplary block diagram of a database application architecture, according to an aspect of the present invention. A database 300 includes a DBMS 310, a Redo and Undo Log 320, a System Tablespace 330, User Tablespaces 340, an Image Management System 370 and a Rollback Management System 380. The user tablespaces 340 contain application data 350 and 360, a Rollback Timestamp Tracking Table 341, a Transaction ID Tracking Table 342, and a User Session Tracking Table 343. The application data contains after image tables 351, 361 before image tables 353, 363, indexes 352, 362, after image views 354, 364, time-based after image views 355, 365, and history image views 356, 366.

The Rollback Timestamp Tracking Table 341 includes the following fields: owner name, table name, retention time, and export_timestamp. The owner name identifies the owner of the particular table. The table name field identifies the name of the particular table. The retention time field of a table records the earliest time that the before images are kept online. In those database systems where the transaction id is accessible to an application user, the retention time is transaction consistent. All before images of any transaction whose transaction ending time at or after the retention time are kept online. The export_timestamp field records the time of the latest export of older before images. The rollback management system 380 manages the Rollback Timestamp Tracking Table 341. The transaction ID tracking table 342 includes the following fields: transaction id, userid, starting_timestamp and ending_timestamp. The transaction ID tracking data can be created online by the database system, or by an application process. The tracking data can also be created as needed through the image management system 370. Time-based After Image Views 355, 365 and History Image Views 356, 366 are created by the image management system 370.

The user session tracking table 343 includes the following fields: user_id, osuser_id, session_id, process_id, terminal_id, login_timestamp, and logout_timestamp. A login and logout trigger will record each user session in the user session tracking table 343. It is noted that in this document a user_id is defined as a user's database id, whereas userid and changing_userid are comprised of its user_id, process_id and session_id. The osuser_id is a user's operating system id.

An exemplary precision for all timestamps is that no more than one database insert/update/delete operation can be performed in any one time unit on any single data row. The requirement for the timestamp precision is that the timestamp and transaction id pair is unique in any single before image and after image table. For instance, a resolution of one nanosecond may be employed; however, a resolution of microsecond may also be employed, especially using a computer with a relatively slow central processing unit (CPU). In one aspect, the precision requirement can be lowered as long as the timestamp and transaction id pair is a component of a unique key in any single before image and after image table. For most methods of the present invention, the precision requirement can be lowered to no more than one database insert/update/delete operation performed in one time unit in any transaction on any single data row. In an another words, no data row can have more than one database insert/update/delete operation in any one time unit. However, a possible exception to this arises in some databases whose DBMS vendor does not provide users the transaction id access when attempting to obtain the change history of a single row in a table that does not have a unique key.

The transaction ID could use the database transaction id when it is easily accessible as with the Oracle database. Otherwise, the application programs would need to be modified in order to provide a unique id for each transaction.

Each application table (ie., after image tables) 351, 361 includes the following fields: timestamp, userid and transaction_id. A new before image table 353, 363 is created for each user application table, wherein each before image table 353, 363 is comprised of fields changing_timestamp, changing_userid, changing_transaction_id and opcode in addition to the fields of its associated after image table. For instance, the opcode field could be either "U" for an update or "D" for a deletion.

A new after image view 354, 364 is created for each after image table 351, 361 without the newly added fields, with a possible exception of the transaction_id when application programs provide the transaction id. In this case, a user application does not access the after and before image tables directly. Instead, all of their operations are through the after image views 354, 364.

For a user table, three triggers, or equivalent procedures, are employed as follows. The insert trigger sets timestamp, userid and transaction_id fields for a new inserted row in the after image table 351, 361. The update trigger inserts the old row into the associated before image table 353, 363 and sets the changing_timestamp, changing_userid, changing_transaction_id fields and sets the opcode field to "U". Then, the update trigger sets the old row's timestamp, userid and transaction_id fields to changing_timestamp, changing_userid, changing_transaction_id, respectively, in the after image table 351, 361. The delete trigger inserts the old row into the associated before image table 353, 363 and sets the changing_timestamp, changing_userid, changing_transaction_id fields and sets the opcode field to "D".

Figure 12:
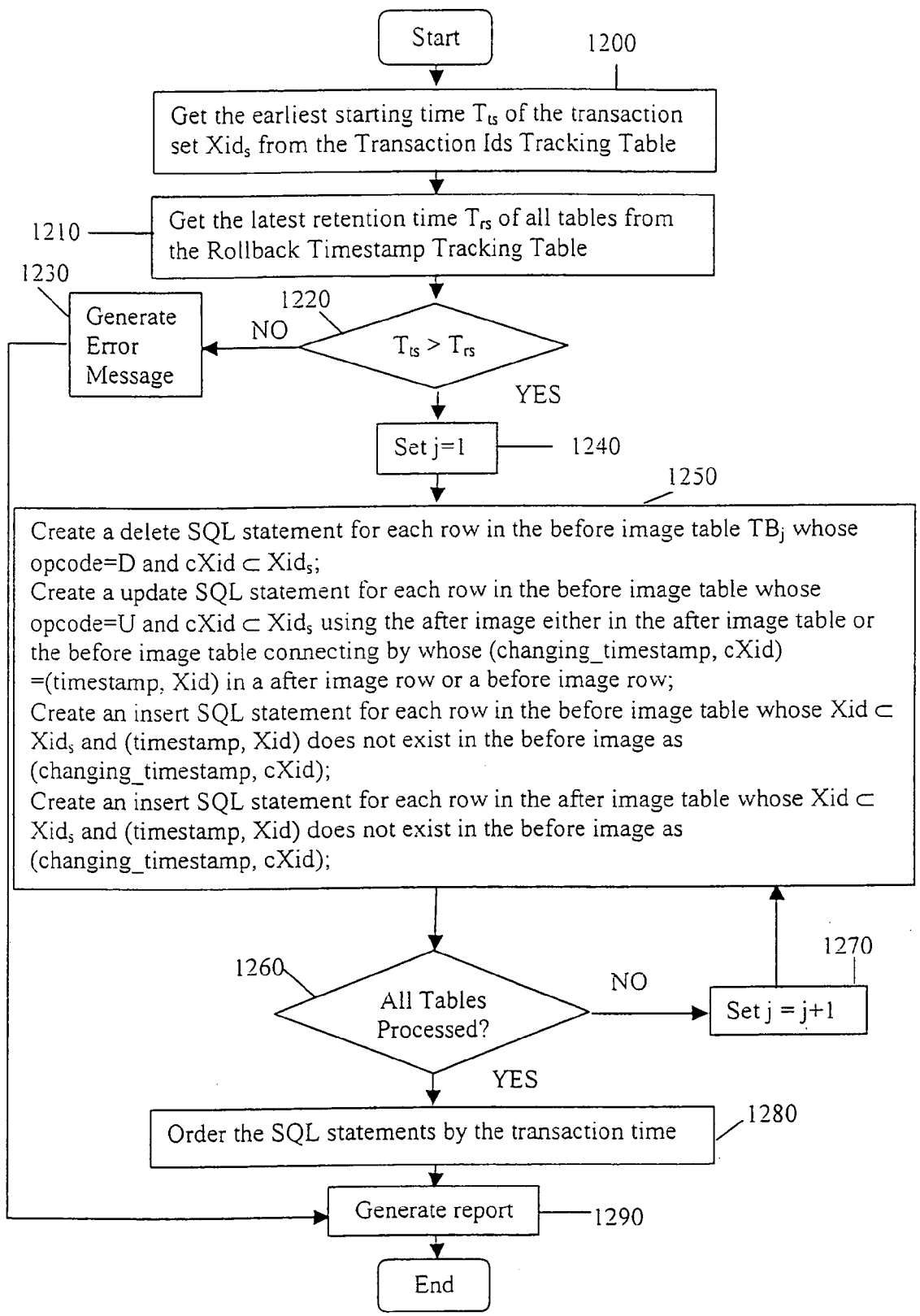
FIG. 12 is an exemplary flow diagram depicting the reconstructing of the equivalent SQL statements of a committed transaction id set, according to an aspect of the present invention.
Figure 13:
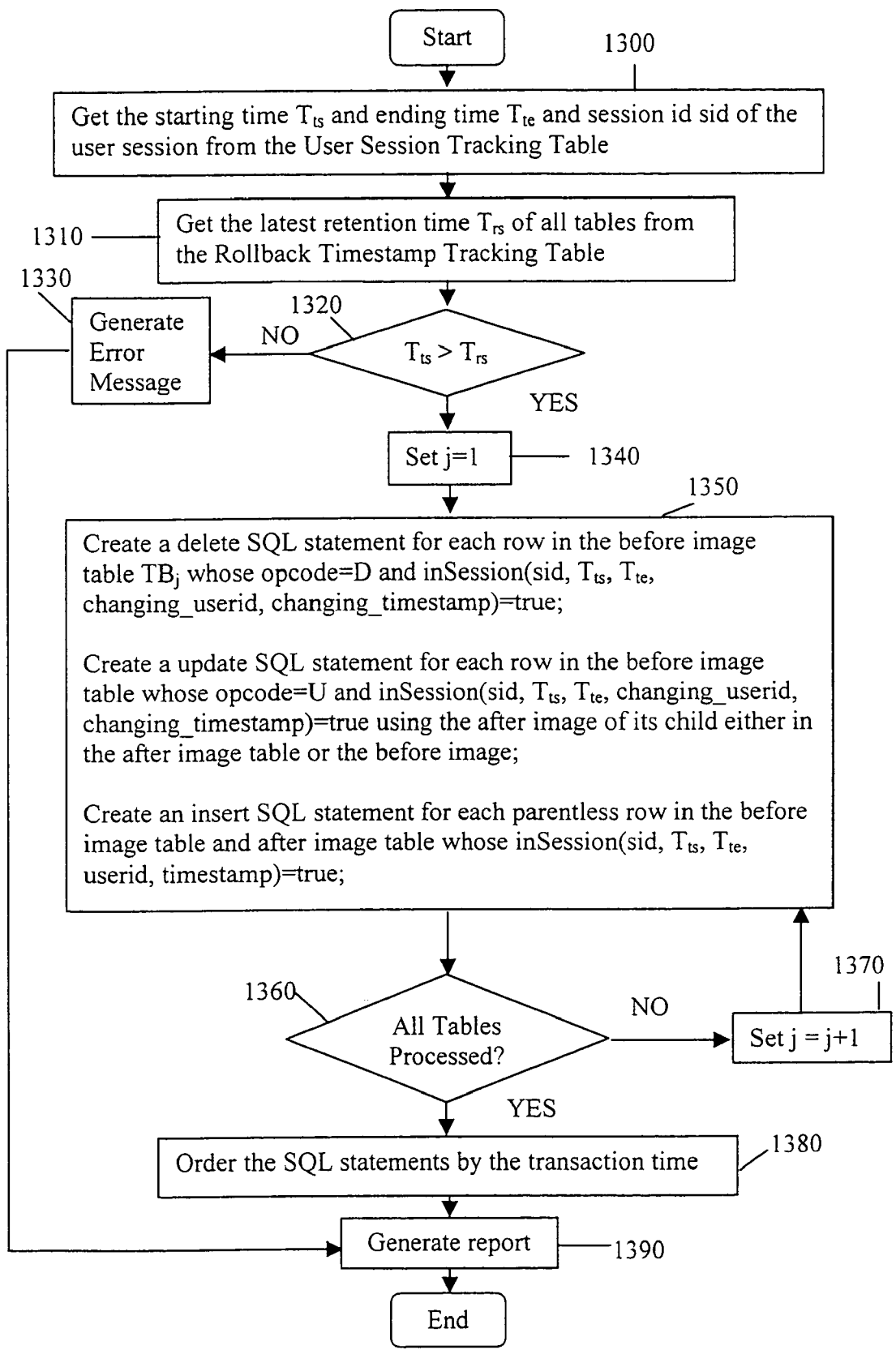
FIG. 13 is an exemplary flow diagram depicting the reconstructing of the equivalent SQL statements of a user session, according to an aspect of the present invention.

Application audit data is embedded in the before image table 353, 363, the after image tables 351, 361, the Transaction Ids Tracking table 342 and the User Session Tracking Table 343. From these tables, an on demand audit report can be generated as to the database activities of a particular user (including the time in which certain data was added and/or modified and/or deleted by a user), using the same principles of reconstructing equivalent SQL statements of a committed transaction or a user session, as will be discussed and which is depicted in FIG. 12 and FIG. 13.

Figure 4:
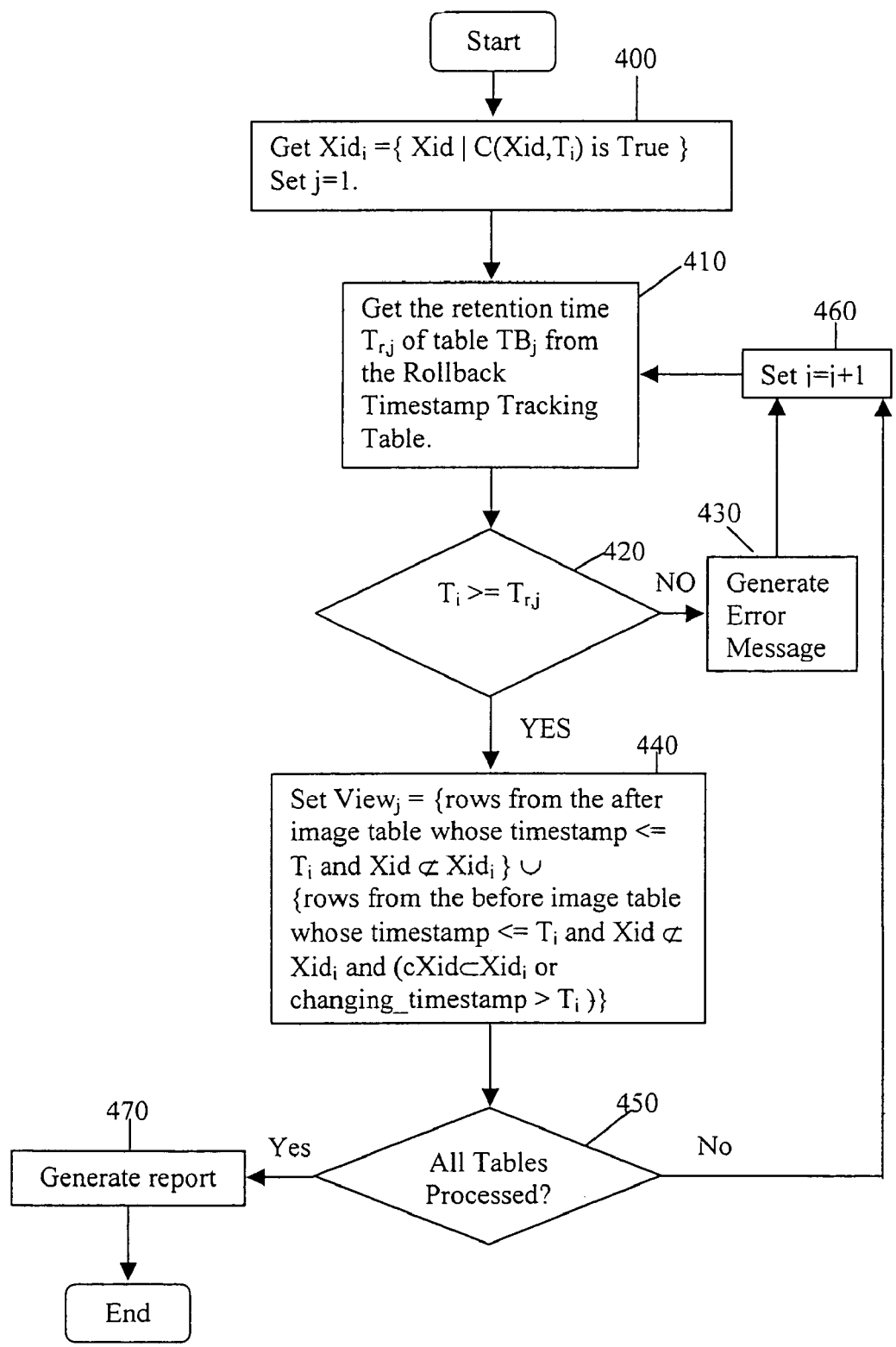
FIG. 4 is an exemplary flow diagram depicting the logic with which a group of point-in-time views of user tables can be created, according to an aspect of the present invention.

FIG. 4 is an exemplary flow diagram depicting the logic with which a group of point-in-time $T_i$ views of user tables can be created, according to an aspect of the present invention. At step 400, a transaction id set $Xid_i$ is retrieved from the transaction ID tracking table 342 in accordance with the following equation where C is a crossover function:

$$Xid_i = \{Xid | C(Xid, T_i) \text{ is True}\},$$

where the function $C(Xid, T_i) = $ true when the transaction begins before or at the time $T_i$ and ends after the time $T_i$. Also at step 400, a loop is begun by setting the table index to j=1. At step 410, the retention time $T_{rj}$ of table $TB_j$ is retrieved from the Rollback Timestamp Tracking Table 341. At step 420, it is determined whether $T_i >= T_{rj}$. If $T_i >= T_{rj}$ (step 420:YES), then step 420 has a positive result and control is transferred to step 440. At step 440, the point-in-time view of table $TB_j$ is set as follows where cXid is a changing_transaction_id:

$$View_j = \{\text{rows from the after image table whose} \\ \text{timestamp} <= T_i \text{ and } Xid \not\subset Xid_i\} \cup$$

{rows from the before image table whose timestamp$<=T_i$ and Xid$\not\subset$Xid$_i$ and (cXid$\subset$Xid$_i$ or changing_timestamp>$T_i$)}.

At step 450, a determination is made as to whether all of the tables have been processed. If all of the tables have been processed (step 450:YES), control is transferred to block 470. At this point, all views will either have been created or error messages will have been generated for those tables whose retention time is later than the point-in-time $T_i$. At step 470, a created point-in-time views'report is generated and the process ends.

Returning now to step 420, if $T_i < T_{rj}$ (step 420:NO), then step 420 has a negative result, and as a result, control is transferred to step 430. At step 430, an error message is generated and logged. Then, at step 460, the table index j is incremented by 1. Afterward, the control returns to step 410 to begin processing a new table.

If all tables have not been processed (step 450:NO), then the control transfers to step 460. At step 460, the table index j is incremented by 1, and subsequently, control returns to step 410 to create a point-in-time view for the next table.

Figure 5:
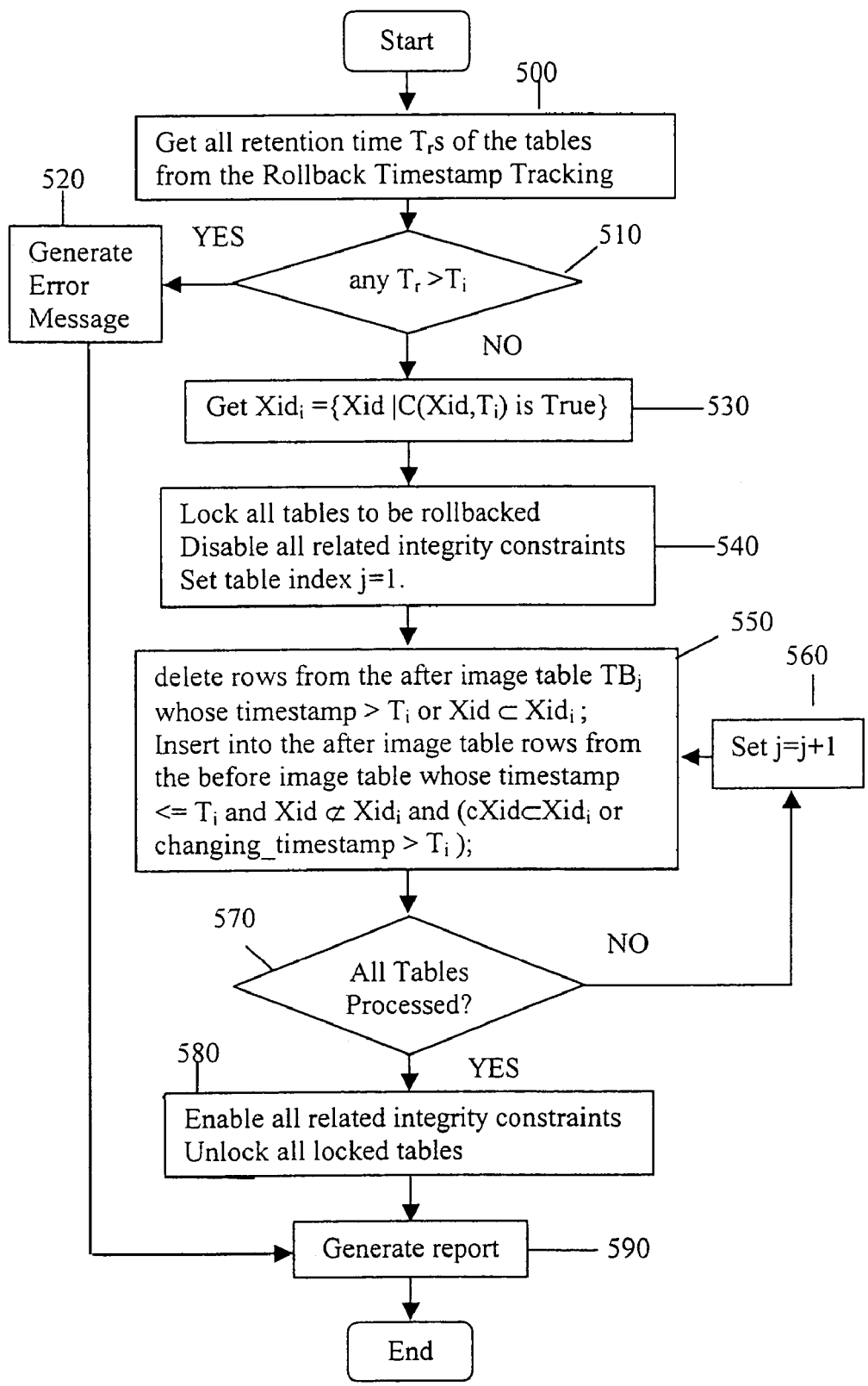
FIG. 5 is an exemplary flow diagram depicting the logic of rollbacking a group of tables to a point-in-time, according to an aspect of the present invention.

FIG. 5 is an exemplary flow diagram depicting the logic of rollbacking a group of tables to a point-in-time, according to an aspect of the present invention. At step 500, the retention times $T_r$s of the tables are obtained from the Rollback Timestamp Tracking Table 341. At step 510, a determination is made as to whether any $T_r > T_i$. If not (step 510:NO), then control is transferred to step 530. At step 530, the transaction id set $Xid_i$ is obtained from the transaction ID tracking table 342, in accordance with the following equation:

$$Xid_i = \{Xid | C(Xid, T_i) \text{ is True}\},$$

where the function $C(Xid, T_i) = \text{true}$ when the transaction begins before or at the time $T_i$ and ends after the time $T_i$.

At step 540, all of the tables are locked in anticipation of being rollbacked and all related integrity constraints are disabled. Also, a loop is begun by setting a table index to j=1. At step 550, rows are deleted from the after image table whose timestamp>$T_i$ or $Xid \subset Xid_i$. In addition, control inserts into the after image table, rows from the before image table whose timestamp<=$T_i$ and $Xid \not\subset Xid_i$ and ($cXid \subset Xid_i$ or changing_timestamp>$T_i$).

At step 570, a determination is made as to whether all of the tables have been processed. If all tables have been processed (step 570:YES), then control is transferred to step 580. At this time, all of the tables to be rollbacked will have been rollbacked to the time $T_i$. At step 580, all related integrity constraints are enabled. If there are any errors, a SQL rollback command is issued to rollback the rollback. Also at step 580, all of the rollbacked tables are unlocked. At step 590, a final rollbacking tables to point-in-time report is generated and the process ends.

If any $T_r > T_i$, has a positive result (step 510:YES), then control transfers to step 520. At step 520 an error message is logged. Then, at step 590, an error report is generated and the process ends.

If it is determined at step 570 that all tables have not been processed (step 570=NO), then control is transferred to step 560. At step 560, the table index j is incremented by 1. Afterward, the control returns to step 550 to begin processing a new table to be rollbacked to the point-in-time $T_i$.

Figure 6:
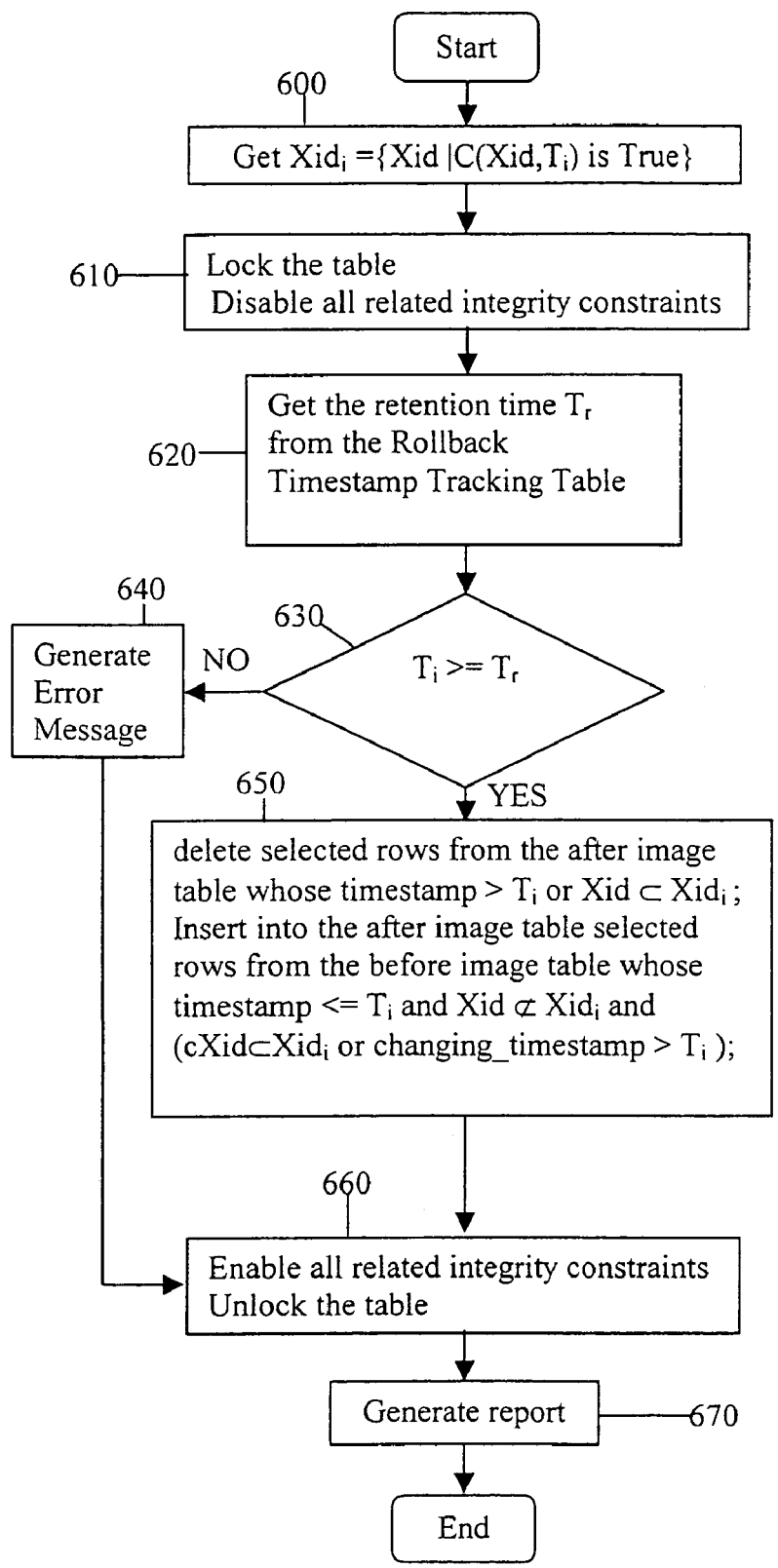
FIG. 6 is an exemplary flow diagram depicting the logic of rollbacking selected rows in a single table to a point-in-time, according to an aspect of the present invention.

FIG. 6 is an exemplary flow diagram depicting the logic of rollbacking selected rows in a single table to a point-in-time, according to an aspect of the present invention. At step 600, a transaction id set $Xid_i$ is retrieved from the transaction ID tracking table 342 in accordance with the following equation:

$$Xid_i = \{Xid | C(Xid, T_i) \text{ is True}\},$$

where the function $C(Xid, T_i) = \text{true}$ when the transaction begins before or at the time $T_i$ and ends after the time $T_i$.

At step 610, the table is locked and all related integrity constraints are disabled. At step 620, the retention time $T_r$ of the table is obtained from the Rollback Timestamp Tracking Table 341. At step 630, a determination is made as to whether $T_i >= T_r$. If step 630 has a positive result (step 630:YES), then control is transferred to step 650. At step 650, selected rows are deleted from the after image table whose timestamp>$T_i$ or $Xid \subset Xid_i$. In addition, control inserts into the after image table selected rows from the before image table whose timestamp<=$T_i$ and $Xid \not\subset Xid_i$ and ($cXid \subset Xid_i$ or changing_timestamp>$T_i$).

At this time, the selected rows of the table have been rollbacked to the time $T_i$ or an error message is logged. At step 660, all related integrity constraints are enabled. If there are any errors, a SQL rollback command is issued to rollback the rollback. Also at step 660, the table is unlocked. At step 670, a final report of rollbacking selected rows in the table to point-in-time is generated and the process ends.

Returning now to step 630, if $T_i >= T_r$ (step 630:NO), then step 630 has a negative result, and consequently, control is transferred to step 640. At step 640, an error message is logged and generated. Then, at step 660, all related integrity constraints are enabled and the table is unlocked. At step 670, an error message report is generated and the process ends.

Figure 7A:
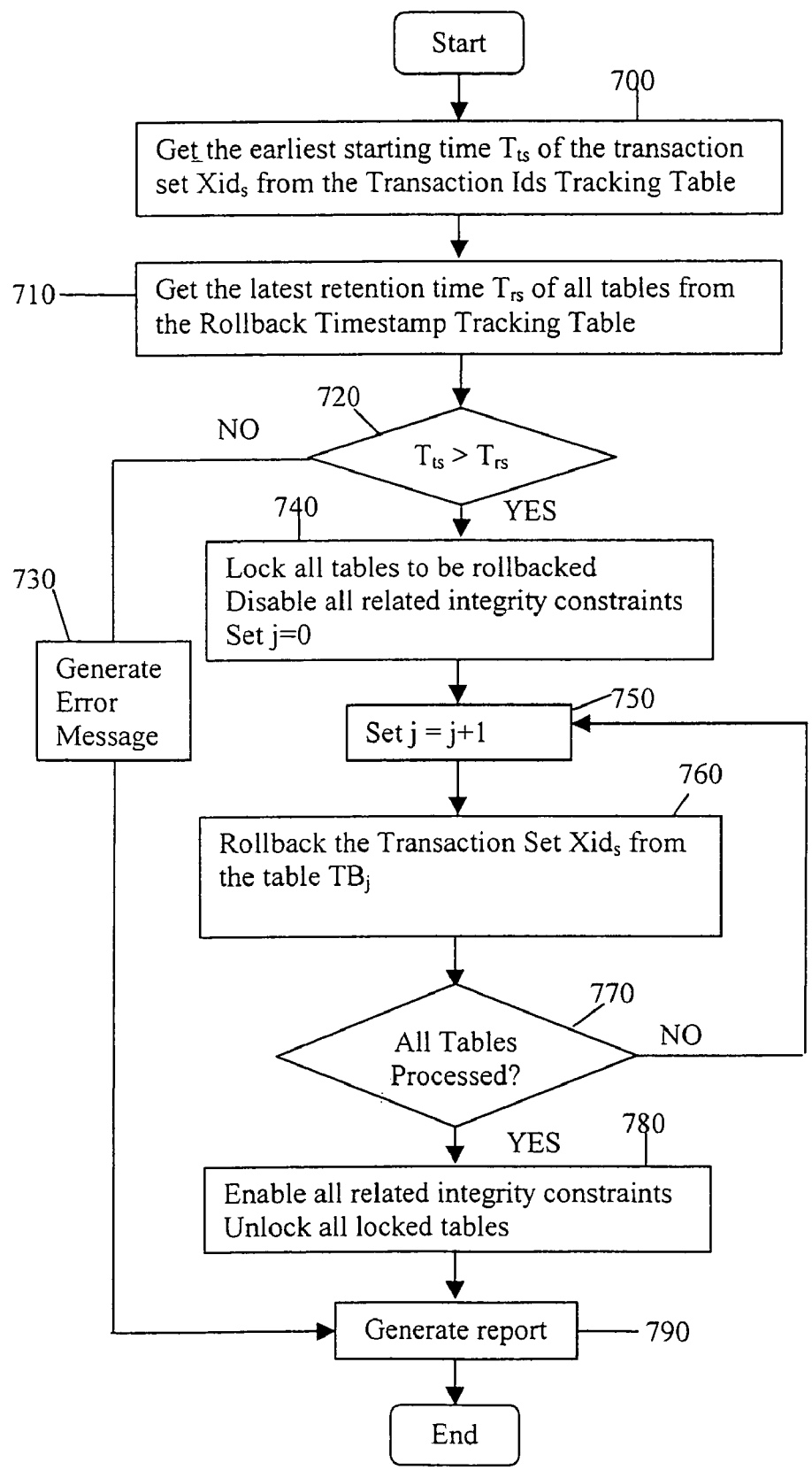
FIG. 7a is an exemplary flow diagram depicting the rollbacking of a transaction id set in a group of tables, according to an aspect of the present invention.

FIG. 7a is an exemplary flow diagram depicting the rollbacking of a transaction id set $Xid_s$ in a group of tables, according to an aspect of the present invention. At step 700, the earliest starting time $T_{ts}$ of the transaction set $Xid_s$ is obtained from the Transaction Ids Tracking Table 342. At step 710, the latest retention time $T_{rs}$ of all tables from the Rollback Timestamp Tracking Table 341 is obtained. At step 720, a determination is made as to whether $T_{ts} > T_s$. If step 720 has a positive result (step 720:YES), then control transfers to step 740. At step 740, all of the tables to be rollbacked are locked and all related integrity constraints are disabled. Further, a table index is set to j=0. At step 750, a loop is begun by setting the table index to j=j+1, starting the table index at 1.

At step 760, the transaction set $Xid_s$ is rollbacked from the table $TB_j$. Unlike rollbacking a new uncommitted transaction, the rollbacking of existing transactions is more complicated. For example, the data processed by the existing transactions may involve more transactions at later times. The logic of step 760 will be discussed below with respect to FIG. 7b and FIG. 7c, under two different business rules, respectively.

At step 770, a determination is made as to whether all of the tables have been processed. If all tables have been processed (step 770:YES), then control is transferred the control to step 780. At this time, all transactions in the transaction id set $Xid_s$ will have been rollbacked. At step 780, all related integrity constraints are enabled. If there are any errors, a SQL rollback command is issued to rollback the rollback. Also at step 780, the tables are unlocked. At step 790, a final transaction rollbacking report is generated and the process ends.

If it is determined at step 770 that all tables have not been processed (step 770:NO), then control is transferred to step 750. At step 750, the table index is incremented by 1. Then, control is transferred to step 760 where the transaction set $Xid_s$ will be rollbacked from a new table.

Returning now to step 720, if $T_{ts} <= T_{rs}$, (step 720:NO), control is transferred to step 730. At step 730, an error message is logged. Then, an error message report is generated at step 790 and the process ends.

The two different business rules, referred to above, for rollbacking an existing committed transaction set Xids are the earliest transaction rule and the last transaction rule. More specifically, if the last transaction of a data row $\not\subset Xid_s$, the after image of the latest transaction will stay after rollbacking the old transaction set $Xid_s$. If the last transaction of a data row $\subset Xid_s$, control will remove the after image of the last transaction from the after image table and insert into the after image table the before image of the earliest operation of the old transaction set $Xid_s$. This rule is referred to as the last transaction rule.

An alternative rule is referred to as the earliest transaction rule. Specifically, the earliest transaction rule ignores any later transaction. That is, all data rows on which the old transaction set $Xid_s$ executed will be restored to the before image of the earliest operation of the old transaction set $Xid_s$.

Figure 7B:
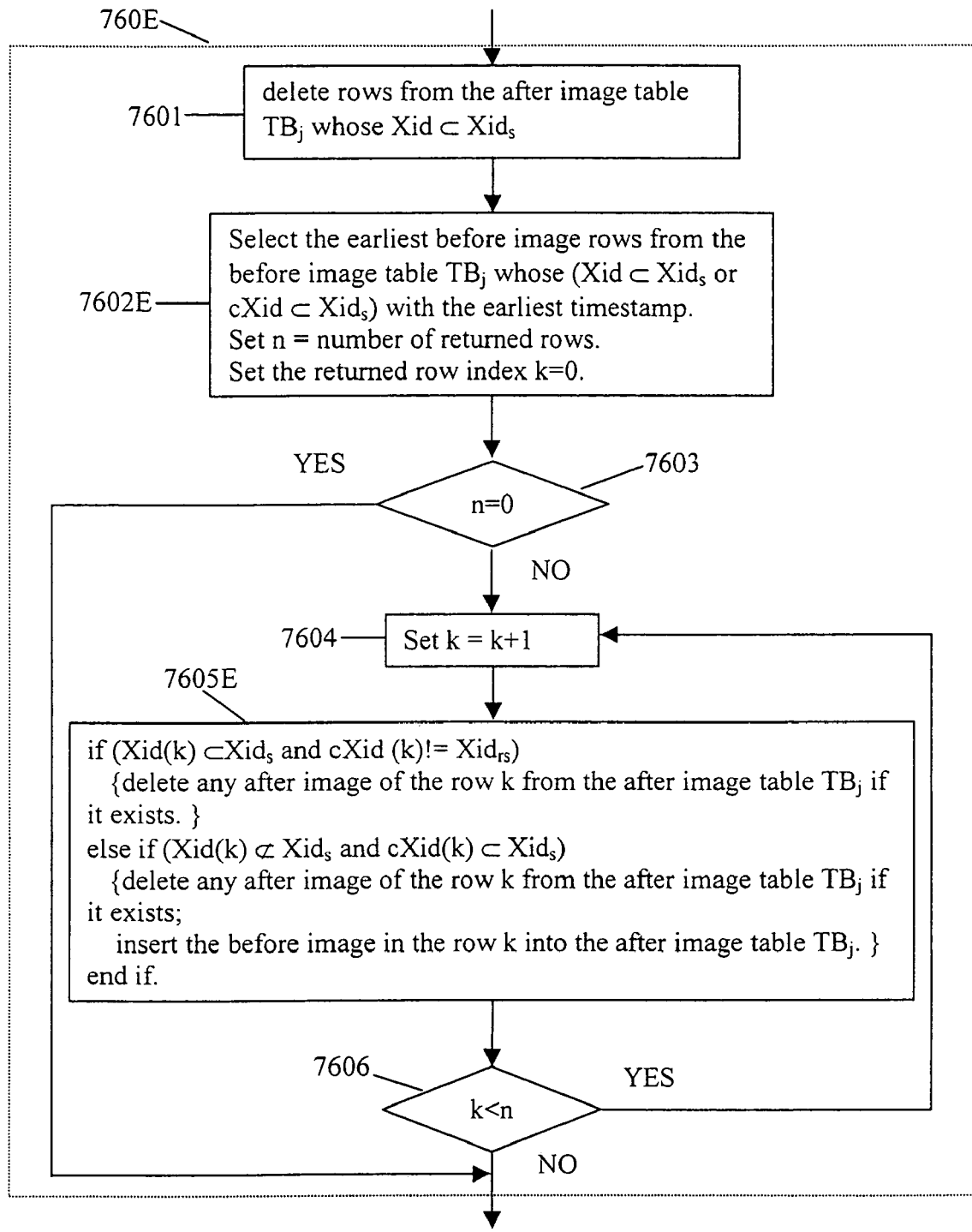
FIG. 7b is an exemplary flow diagram depicting the logic of rollbacking the transaction id set in accordance with an earliest transaction rule, according to an aspect of the present invention.

FIG. 7b is an exemplary flow diagram depicting the logic of rollbacking the transaction set $Xid_s$ from the table $TB_j$ in accordance with the earliest transaction rule. Step 760E is an exemplary implementation of the step 760 in FIG. 7a, in accordance with the earliest transaction rule. At step 7601, rows from the after image table $TB_j$ are deleted whose $Xid \subset Xid_s$. At step 7602E, the earliest before image row is selected from the before image table $TB_j$ whose ($Xid \subset Xid_s$ or $cXid \subset Xid_s$) with the earliest timestamp. A data row may have zero, one or more transactions whose $Xid \subset Xid_s$ or $cXid \subset Xid_s$.

The before image of a data row is the parent of the after image of the data row at the same transaction, and conversely, the after image is the child of the before image. Further, all of the data images can be grouped into data row families. Specifically, each data row family consists of zero or one after image and zero or more before images linked by an ancestral relationship. Moreover, each data row family can contain one or more life cycles. A life cycle begins when the data row is inserted into an after image table. The newly inserted after image is the oldest ancestor of this life cycle. Each updating on the data row generates a new child in the after image table and puts its parent into the before image table. The deletion of the data row marks the end of the life cycle and puts the youngest descendant of this life cycle into the before image table. When the data row is reinserted into the after image table, a new life cycle of the same data row family begins. The selected earliest before image of a data row is the oldest ancestor for the data row, in which one transaction in the transaction set $Xid_s$ was executed.

Referring again to step 7602E, there is no more than one before image row returned for each data row family. Also at step 7602E, n is set to the number of returned rows and a returned row index is set to k=0. At step 7603, a determination is made as to whether n=0. If n is not equal to 0 (step 7603:NO), then control is transferred to step 7604. At step 7604, a loop is begun by starting the data row index at 1, i.e., k=k+1.

At step 7605E, the transaction set $Xid_s$ on the data row k in the table $TB_j$ is rollbacked. If the returned transaction id Xid (k) of the row k$\subset Xid_s$ and the changing transaction id cXid (k) is not equal to $Xid_{rs}$, any after image of the row k from the after image table $TB_j$ is deleted, if it exists. $Xid_{rs}$ is the current transaction id. If the returned transaction $Xid(k) \not\subset Xid_s$ and the changing transaction id $cXid(k) \subset Xid_s$, any after image of the row k is deleted from the after image table $TB_j$, if it exists. Also, the returned before image of the row k is inserted into the after image table $TB_j$.

At step 7606, a determination is made as to whether all returned rows have been processed. If all of the returned rows have been processed (k>=n), then control is transferred to step 770 in FIG. 7a. Otherwise, if k<n, then control is transferred to step 7604. At step 7604, the row index k is incremented by 1. Then, the transaction set $Xid_s$ will be rollbacked on a new data row. If n=0 at step 7603, then control is transferred to step 770 in FIG. 7a.

Figure 7C:
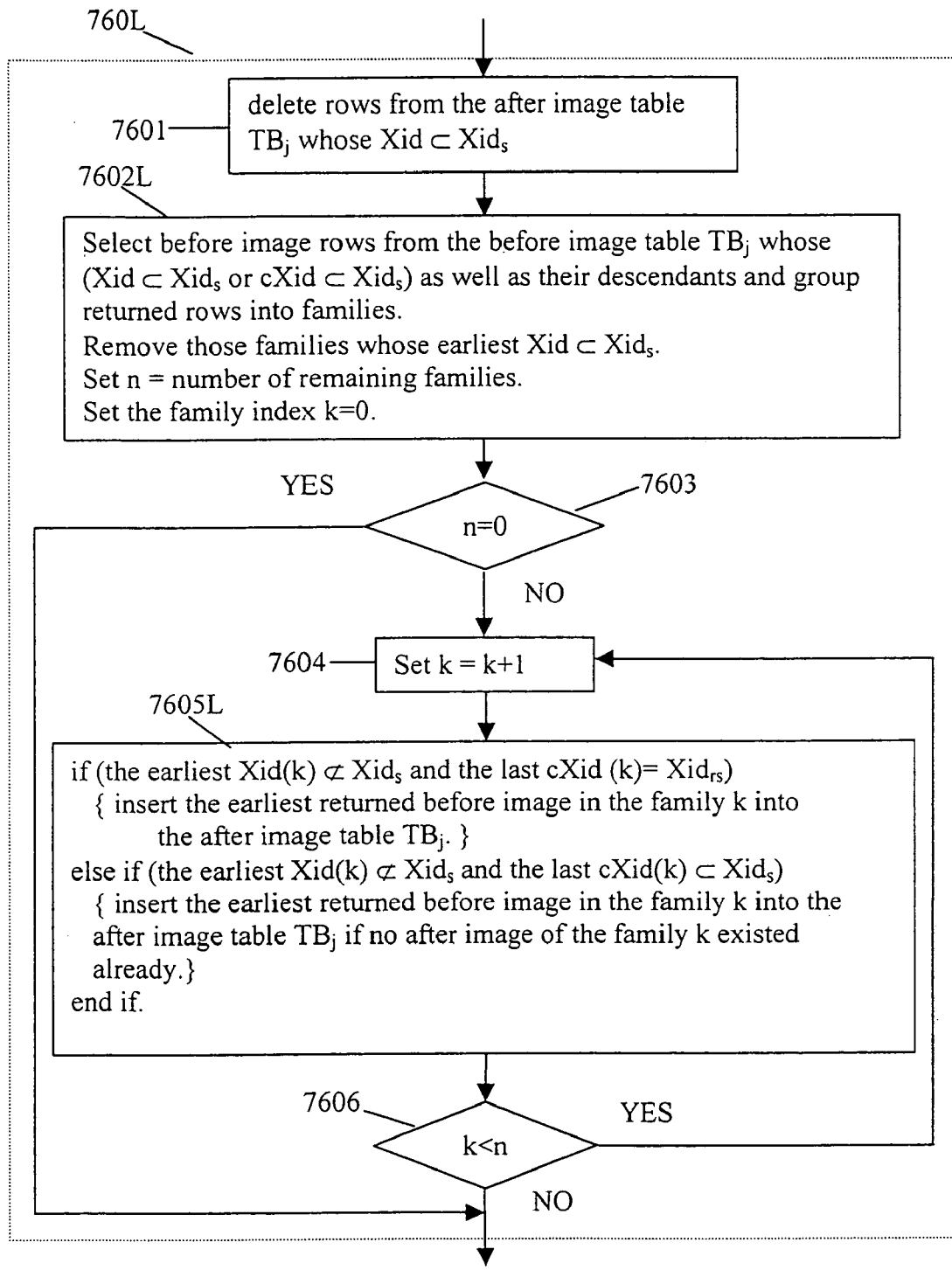
FIG. 7c is an exemplary flow diagram depicting the logic of rollbacking the transaction id set in accordance with a last transaction rule, according to an aspect of the present invention.

FIG. 7c is an exemplary flow diagram depicting the logic of rollbacking the transaction set $Xid_s$ from the table $TB_j$ in accordance with the last transaction rule. Step 760L is an exemplary implementation of the step 760 in FIG. 7a, in accordance with the last transaction rule. At step 7601, rows are deleted from the after image table $TB_j$ whose $Xid \subset Xid_s$. At step 7602L, before image rows from the before image table $TB_j$ are selected whose ($Xid \subset Xid_s$ or $cXid \subset Xid_s$) as well as their descendants and group returned rows into families. Further, those families are removed whose earliest transaction $Xid \subset Xid_s$. Also, n is set to the number of remaining families and a returned family index is set to k=0. If n is not equal to 0 (step 7603:NO), then control is transferred to step 7604. At step 7604, a loop is begun by starting the data row family index to 1, i.e., k=k+1.

At step 7605L, the transaction set $Xid_s$ is rollbacked on the data row family k in the table $TB_j$. If the earliest transaction $Xid(k) \not\subset Xid_s$ and the last transaction cXid (k)=$Xid_{rs}$, the earliest returned before image in the family k is inserted into the after image table $TB_j$. $Xid_{rs}$ is the current rollbacking transaction id. If the earliest transaction $Xid(k) \not\subset Xid_s$ and the last transaction $cXid(k) \subset Xid_s$ and no after image of the family k exists in the after image table $TB_j$, the earliest returned before image in the family k is inserted into the after image table $TB_j$.

At step 7606, a determination is made as to whether all returned data row families have been processed. If all of the returned data row families have been processed (k>=n), then control is transferred to step 770 in FIG. 7a. Otherwise, if k<n, then control is transferred to step 7604. At step. 7604, the data row family index k is incremented by 1. Then, the transaction set $Xid_s$ will be rollbacked on a new data row family. If n=0 at step 7603, then control is transferred to step 770 in FIG. 7a.

Figure 8:
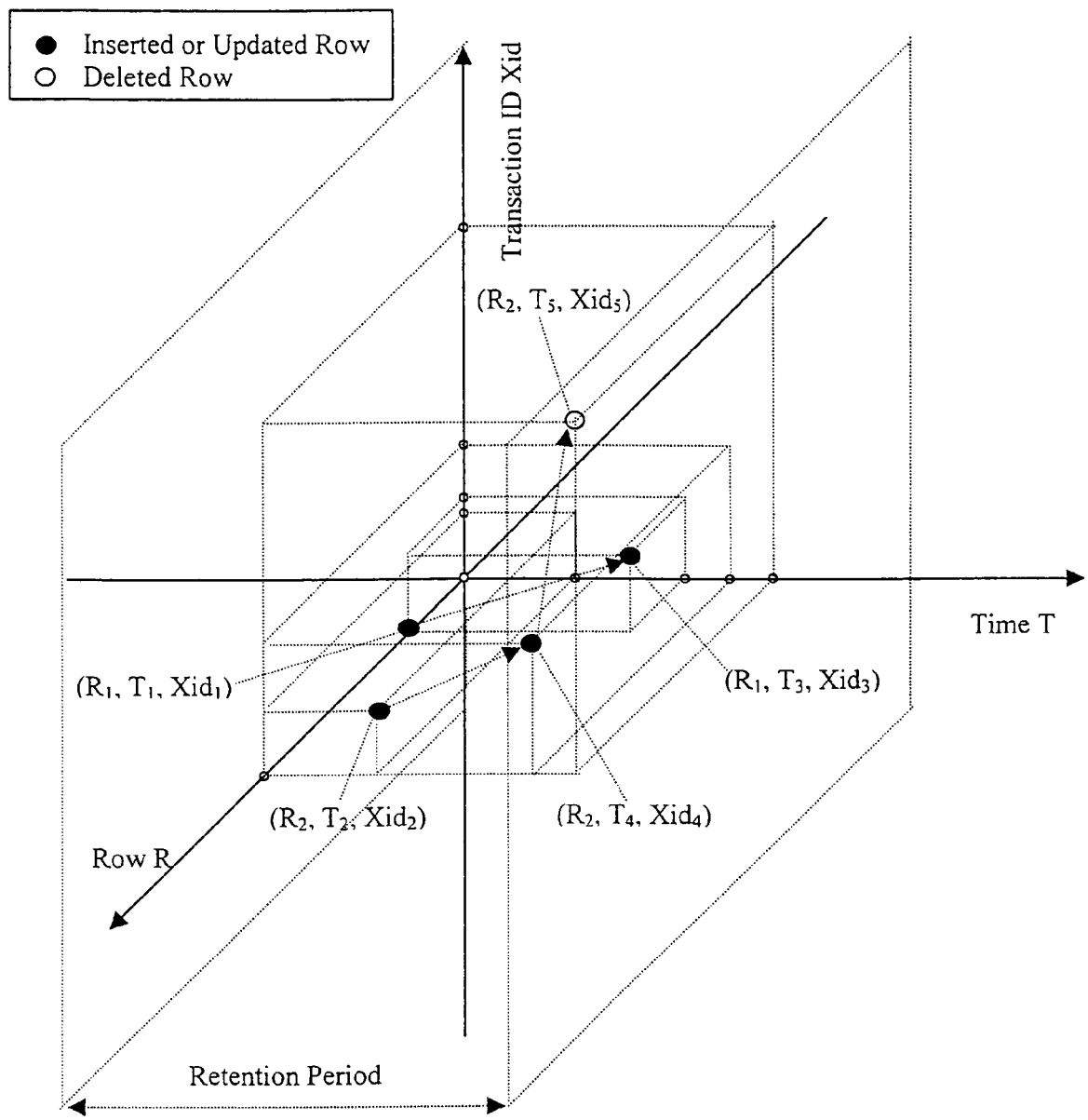
FIG. 8 is an exemplary three-dimensional diagram of a data transaction, according to an aspect of the present invention.

FIG. 8 is an exemplary three-dimensional diagram of a data transaction, according to an aspect of the present invention. As shown in the drawing, the time "T" is represented along the west to east axis, the transaction ID Xid is represented along the bottom to top axis, and the data row "R" is represented by the off paper or out of the page axis. A solid black circle represents an inserted or an updated row and an unshaded, white circle represents a deleting row (operation). Each operation is represented according to the three-dimensional coordinate system (R, T, Xid). A dashed cuboid is used to denote three dimensional coordinates of transaction operations. Operations on the same data row are connected by dashed arrow lines. FIG. 8 shows the following five transaction operations: $(R_1, T_1, Xid_1)$, $(R_1, T_3, Xid_3)$, $(R_2, T_2, Xid_2)$, $(R_2, T_4, Xid_4)$, and $(R_2, T_5, Xid_5)$. All transactions in the retention period are stored online in the after and before image tables.

Figure 9:
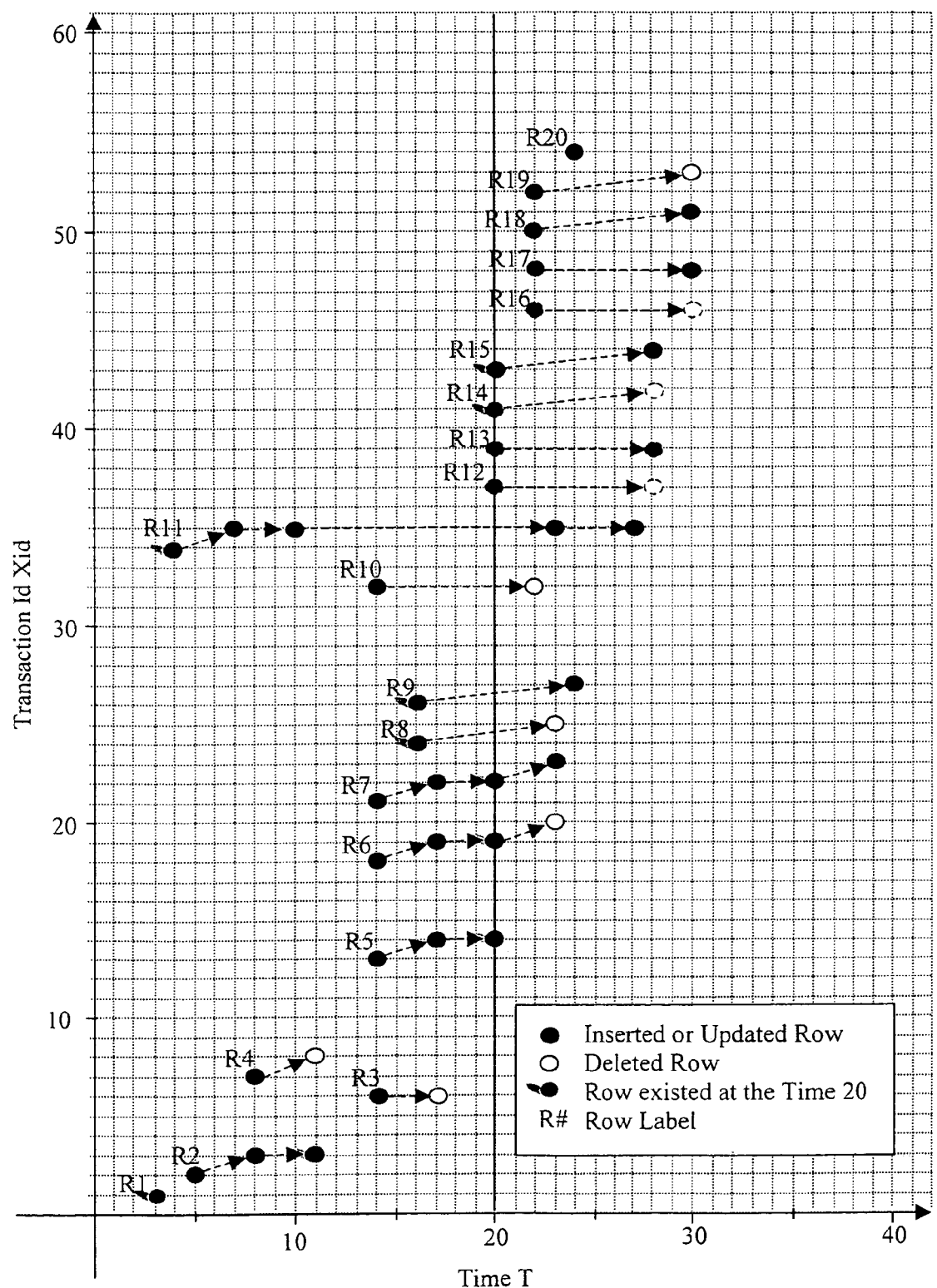
FIG. 9 is an exemplary two-dimensional data transaction time diagram, according to an aspect of the present invention.

FIG. 9 is an exemplary two-dimensional data transaction time diagram, according to an aspect of the present invention. Using the processing discussed with respect to FIG. 5, the after images are rollbacked to the time 20. The transaction id set $Xid_t$ that crossed the time 20 is (32, 35, 37, 39). The rollbacked after images are represented by solid black circles having a trailing shadow. For simplicity of the discussion, assume that the original application table (the after image view) has only two columns: (row_id, value). The after image table has following columns: (row_id, value, userid, timestamp, Xid). The before image table has following columns: (row_id, value, userid, timestamp, Xid, changing_userdid, changing_timestamp, cXid, opcode). Application users can only access an after image view with the columns (row_id, value), and cannot access the after and before image tables directly. For example, as shown in the figure, at time 16, a new row 9 (row_id, value)=(R9, 0) designated "R9" is inserted into the after image view by a user A in the transaction whose id Xid is 26. In the after image table, the row 9 (row_id, value, userid, timestamp, Xid)=(R9, 0, A, 16, 26) is inserted. At the time 24, the value of the row 9 is updated to 1 by user B in the transaction whose id Xid is 27. In the before image table, a new row containing the old after image (row_id, value, userid, timestamp, Xid, changing_userid, changing_timestamp, cXid, opcode)=(R9, 0, A, 16, 26, B, 24, 27, U) is inserted. In the after image table, the new after image of the row 9 becomes (row_id, value, userid, timestamp, Xid)=(R9, 1, B, 24, 27). The after image view for the row R9 is (row_id, value)=(R9, 1). Let us assume that at the time 100, a user C rollbacks the table, the after image view, to the time 20 by the transaction whose id Xid is 1000. Because the timestamp of the row 9 is larger than 20, the after image of the row 9 is deleted. The following before image of the row R9 is added to the before image table: (row_id, value, userid, timestamp, Xid, changing_userid, changing_timestamp, cXid, opcode)=(R9, 1, B, 24, 27, C, 100, 1000, D). The before image stored in the row (row_id, value, userid, timestamp, Xid, changing_userid, changing_timestamp, cXid, opcode)=(R9, 0, A, 16, 26, B, 24, 27, U) is inserted into the after image table. The row 9 in the after image table becomes (row_id, value, userid, timestamp, Xid)=(R9, 0, C, 100, 1000). The after image view for the row R9 is (row_id, value)=(R9, 0), that is the image at the time 20. As far as application users concerned, the table (actually an after image view) is rollbacked to the time 20.

The application data recovery to a point-in-time is faster and more efficient, and operates without using any log, incremental or delta backup image (i.e., full backup+incremental backup+log). The primary database provides any time image backup to the minimum retention period of all user tables. For a media failure, the database can be recovered from a backup copy of the database and log files. The application's errors and users' errors can be recovered online if the error occurred inside the retention period. If the point-in-time is outside of the minimum retention period, one can, for example, load the related before image tables to the primary or a secondary database from export files or set up a database instance using a backup image that covers the point-in-time. Since the backup strategies provide 100% redundancies, one can choose the backup image whose backup time is larger than any closest to the point-in-time.

Figure 10:
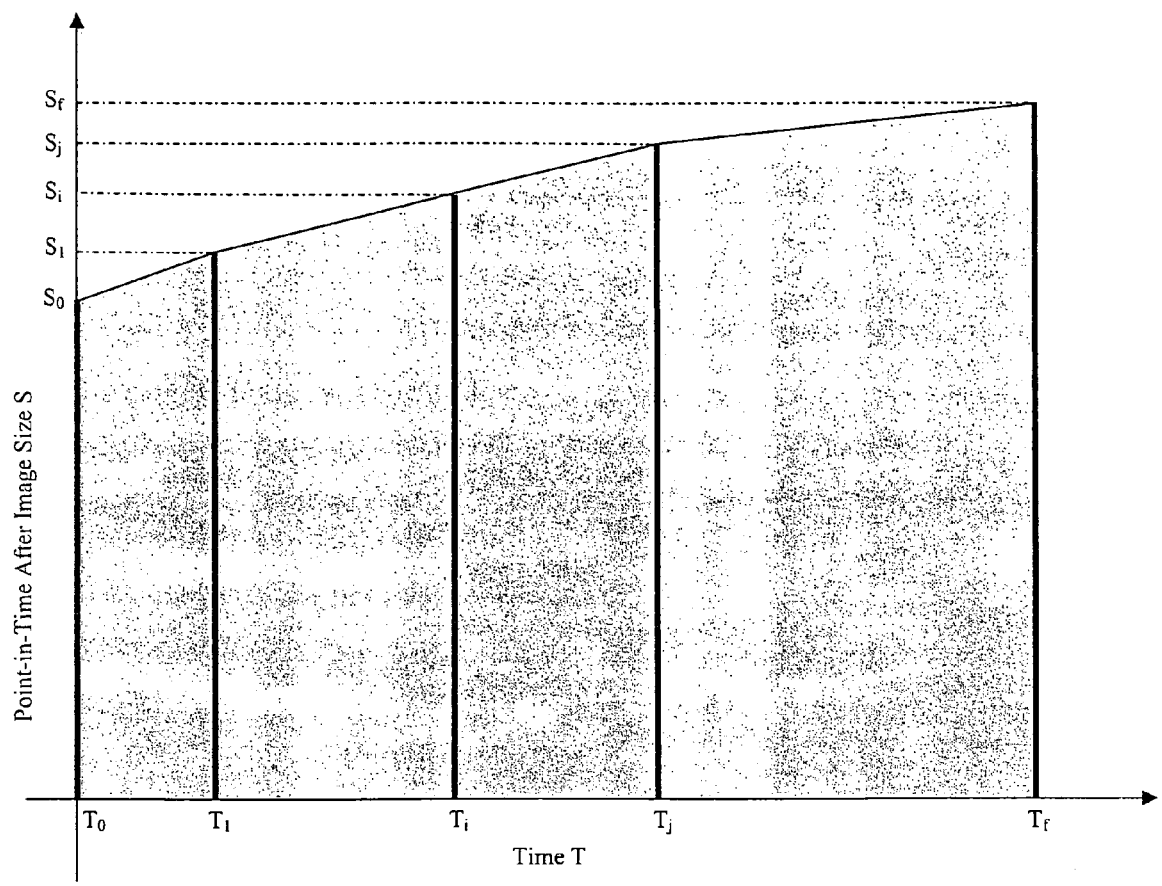
FIG. 10 is an exemplary point-in-time after image size diagram, according to an aspect of the present invention.

FIG. 10 is an exemplary point-in-time after image sizes S(T) diagram, according to an aspect of the present invention. The minimum retention time $T_{r,min}$ is assumed to be $T_f-T_0$. At the time $T_f$, the after images size is $S_f$ and the before images size is $S_{f,b}$. Since we have online any time after image views from the time $T_0$ to $T_f$, the total storage saved more than compensates for the extra before images storage size $S_{f,b}$. The saving ratio $R_s$, which may exceed 90% in some cases, can be calculated according to the following equation:

$$R_S = \left( \int_{T_0}^{T_f} S(T) dT - (S_f + S_{f,b}) \right) \Big/ \int_{T_0}^{T_f} S(T) dT.$$

Figure 11:
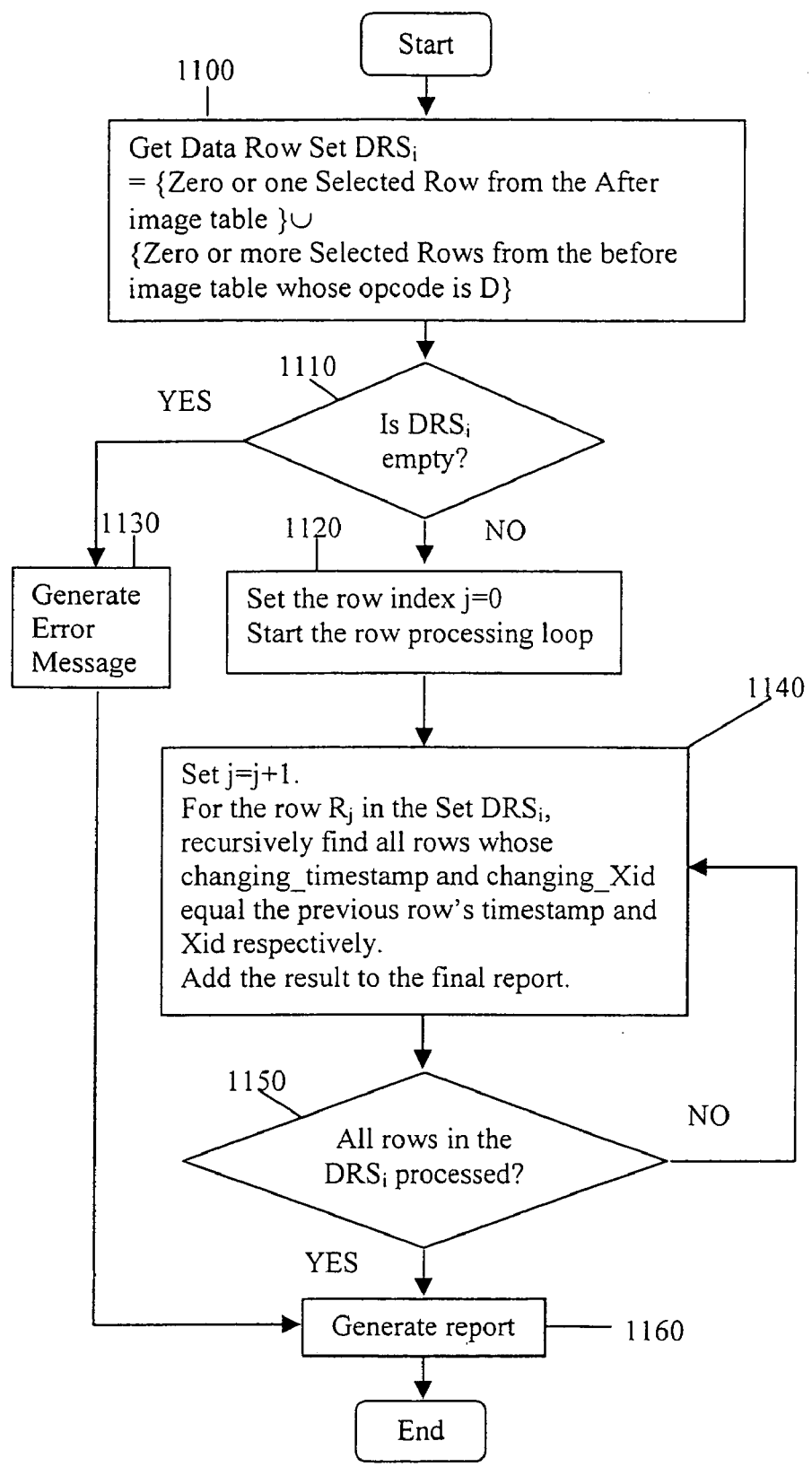
FIG. 11 is an exemplary flow diagram depicting the logic of obtaining a history of a single data row, according to an aspect of the present invention.

FIG. 11 is an exemplary flow diagram depicting the logic of obtaining a history of a single data row, according to an aspect the present invention. It is noted that a single data row may be updated and deleted many times and that the history of all life cycles may be obtained, if one counts each inserting, zero or more updating, and zero or one deleting as a life cycle of the data row.

At step 1100, a data row set $DRS_i$ is obtained by getting the union of two set of rows as follows:

$DRS_i$={Zero or one Selected Row from the after image table}∪

{Zero or more Selected Rows from the before image table whose opcode is "D"}. The returned row from the after image table represents the current life cycle, while the return row(s) from the before image table represent past life cycles.

At step 1110, a determination is made as to whether the set $DRS_i$ is empty. If the set $DRS_i$ is not empty (step 1110:NO), then step 1110 has a negative result and control is transferred to step 1120. At step 1120, a row index is set to j=0 and a row processing loop is begun. At step 1140, the row index is set to j=j+1, starting the row index at 1. Also, for the row $R_j$ in the set $DRS_i$, step 1140 recursively finds all rows whose changing_timestamp and changing_Xid equals the previous row's timestamp and Xid respectively. Then, the result is added to the final report.

At step 1150, a determination is made as to whether all of the rows in the $DRS_i$ have been processed. If all of the rows in the set DRSi have been processed (step 1150:YES), then step 1150 transfers control to step 1160. At this point, either the history of a single data row is obtained or an error message has been generated. At step 1160, a final history report is generated and the process ends. If all of the rows are determined not to have been processed at step 1150 (step 1150:NO), then step 1150 has a negative result and the control transfers back to step 1140 to process the next row.

If the set $DRS_i$ is empty (step 1110:YES), then step 1110 has a positive result, and control is transferred to step 1130. At step 1130, an error message is logged. Then, at step 1160, an error message is generated and the process ends.

FIG. 12 is an exemplary flow diagram depicting the reconstructing of the equivalent SQL statements of a committed transaction id set, according to an aspect of the present invention. If the SQL statement has not been audited in advance it is very difficult, if not possible, to retrospectively reconstruct the exact SQL statements of a committed transaction without knowing the proprietary log structure of database vendors. However the reconstructed equivalent SQL statements will produce the same result as the original SQL statements.

At step 1200, the earliest starting time $T_{ts}$ of the transaction set $Xid_s$ is obtained from the Transaction Ids Tracking Table 342. At step 1210, the latest retention time $T_{rs}$ of all tables related to the transaction set from the Rollback Timestamp Tracking Table 341 is obtained. At step 1220, a determination is made as to whether $T_{ts}>T_{rs}$. If step 1220 has a positive result (step 1220:YES), then control transfers to step 1240. At step 1240, a table index is set to j=1.

At step 1250, a loop is begun by starting the table index at 1. For each row in the before image table $TB_j$ whose opcode=D and cXid⊂$Xid_s$, a delete SQL statement is created. For each row in the before image table $TB_j$ whose opcode=U and cXid⊂$Xid_s$, an update SQL statement is created using the after image either in the after image table or the before image table connecting by whose (changing_timestamp, cXid)=(timestamp, Xid) in an after image row or a before image row. If the after image view has a unique key then the where clauses of the equivalent update and delete SQL statement use the unique key. Otherwise the where clause will use the full-before image of all columns of the after image view.

For each row in the before image table whose Xid⊂$Xid_s$ and (timestamp, Xid) does exist in the before image as (changing_timestamp, cXid), an insert SQL statement is created. For each row in the after image table whose Xid⊂$Xid_s$ and (timestamp, Xid) does not exist in the before image as (changing_timestamp, cXid), an insert SQL statement is created.

At step 1260, a determination is made as to whether all of the tables have been processed. If all tables have been processed (step 1260:YES), then control is transferred the control to step 1280. At this time, all equivalent SQL statements of the transaction id set $Xid_s$ will have been reconstructed. At step 1280, the SQL statements are sorted based on the transaction timestamp and grouped by the transaction. At step 1290, a final reconstruction of equivalent SQL statements of the transaction set report is generated and the process ends.

If it is determined at step 1260 that all tables have not been processed (step 1260:NO), then control is transferred to step 1270. At step 1270, the table index is incremented by 1. Then, control is transferred to step 1250 where the equivalent SQL statements of the transaction set $Xid_s$ will be reconstructed from a new table.

Returning now to step 1220, if $T_{ts} <= T_{rs}$, (step 1220:NO), control is transferred to step 1230. At step 1230, an error message is logged. Then, an error message report is generated at step 1290 and the process ends.

Inserting and deleting are only two data operations used in the application data recovery according to the principles of the present invention. The recovery operation also relates to undoing previous changes. The committed recovery operation can be undone as well. That is, in order to reapply or redo the previous changes, the recovery transactions are recovered again by rollbacking the recovery transactions, as illustrated in FIG. 7. For instance, the redo operation consists of another undo operation. In fact, there are no limits on how many undo and redo operations can be executed by the present invention, provided the database has sufficient tablespace for the respective undo and redo operations.

It is noted that the before image tables do not protect the after image tables from being dropped or truncated or altered. Therefore, to prevent an application administrator from accidentally dropping or truncating or altering the after images and before images tables, the rollback management system 380 has a trigger for table dropping and altering and another trigger for table truncating, if the database vendor provides the table truncation functionality. If a table is under the control of the rollback management system 380, the triggers will prevent the table from being dropped or truncated or altered. However, if the application administrator wants to truncate or drop or alter the table, the administrator needs to export both the before and after image tables first, and then disable the triggers, in order to truncate or drop or alter the table. Depending on what the administrator wants to do with the table, the administrator may need to perform some database management duties.

That is, before an application administrator imports any after image table into the database, the administrator needs to make sure that the before image table will be consistent with the after image table after the import operation. The inserting trigger will be disabled during the import operation unless the imported data are new. The exported after image and before image tables can be imported to a new database. The inserting trigger will be disabled during the import operation in the new database.

Referring again to FIG. 3, the user session tracking table 343 provides the basis for user auditing, rollbacking a user session, and reconstructing equivalent SQL statements made in a user session. From the user session tracking table 343 and the transaction ID tracking table 342, the database administrator can ascertain what transactions a particular user has executed, and when that user executed those transactions. The administrator can then further investigate what those transactions have done on the after image and before image tables. Also the administrator can reconstruct the equivalent SQL statements issued by the user using the rollback management system 380 as discussed with respect to FIG. 12. Then, if some transactions need to be reversed, the administrator can rollback those transactions using the rollback management system 380. Specifically, the administrator may retrieve the particular user's user_id, process_id, session_id, login_timestamp, and logout_timestamp, from the user session tracking table 343 to determine the respective userid. Then, all of the table names and transaction ids marked by the user by the identified userid during the period from the login_timestamp to the logout_timestamp are retrieved. The table names and transaction id may then be used as was discussed with respect to FIGS. 7*a*, 7*b*, and 7*c*.

The embodiment discussed until now may generally be referred to as transaction consistent with user tracking. According to an alternative embodiment of the present invention, all user information fields (userid, and changing_userid) may be removed from the after and before image tables. This embodiment, also referred to as a transaction consistent embodiment, maintains all of the functionalities of the embodiment discussed above, except as to the user tracking-related functionalities. That is, the transaction consistent embodiment may be desirable for those applications where user tracking is not important.

An application data recovery is more complicated than the rollback of an uncommitted transaction. When a user rollbacks an uncommitted transaction, no one can see the results of the transaction, except if the application is using a so-called dirty reading mode. Although a committed transaction can be rollbacked, it is almost impossible to rollback any committed transaction without leaving some impacts of rollbacked transactions intact. However, there is no tracking system to monitor which following transaction used the result of the transaction. Therefore, the application data recovery may involve other remedies as well.

If the boundary of committed transactions can be broken in the application recovery, then another embodiment of the present invention removes all the transaction id fields in the before and after image tables. This embodiment may be suitable for those applications whose database vendor does not provide easily accessible transaction id information and whose users cannot or do not want to change the application to provide an unique transaction id for each transaction. This embodiment inherits all functionalities discussed previously, except for rollbacking a selected transaction set. In this case, the crossing transaction set $Xid_i$ would be set to empty.

Transaction free time zones exist in almost all database applications. In this regard, the point-in-time may reside in a transaction free zone. In another embodiment, transaction consistent point-in-time views may be provided for generating summary reports, such as daily, monthly, quarterly, and yearly reports. To provide transaction consistent point-in-time views for those reports, the database administrator will set up some transaction free zones at predetermined times, (e.g., midnight, 0200 hours, etc.), lasting a few seconds each. In this way, the daily, monthly, quarterly, and yearly reports can be generated based on transaction consistent point-in-time views, referred to as a time-based embodiment with user tracking.

Another alternative embodiment is to remove all user information fields (userid, and changing_userid) in the after and before image tables of the time-based embodiment with user tracking, i.e., the time-based embodiment without user tracking. This embodiment has all the functionalities of the time-based embodiment with user tracking, except for the user tracking related functionality. This embodiment may be desirable for applications with no need to track users and whose database vendor does not provide easily accessible transaction id information, and whose users cannot or do not want to change the application to provide an unique transaction id for each transaction.

The userid and changing_userid in the above embodiments can be replaced by a session_id and a changing_session_id respectively; however, the associated functionality remains the same. The userid and changing_userid can obtained by joining the User Session Table 343. The session_id and changing_session_id are exchangeable with the userid and changing_userid in the following discussion of reconstructing the equivalent SQL statements of a user session and rollbacking a user session.

FIG. 13 is an exemplary flow diagram depicting the reconstructing of the equivalent SQL statements of a user session, according to an aspect of the present invention. This method can used in any embodiment having user session tracking and where a userid and a timestamp are a component of a unique key in any single before and after image table. Although, the unique key does not need be created as long as the uniqueness of the key is guaranteed. Although some database vendors do not provide user access to a transaction id, there are many natural boundaries of transaction sets. For example, a user session starts at the login timestamp, contains zero or more transactions, and ends at logout timestamp. Although, an individual transaction id is not available, the transaction id set is uniquely identified by the session's userid and login and logout timestamps.

To facilitate the discussion, we create an in Session function to test whether or not a user execution belong to a session. The function in Session(sid, starting_timestamp, ending_timestamp, userid, timestamp) is true when the user id userid contains the session id (sid) and the user execution timestamp is larger or equal to the session starting_timestamp and the timestamp is less or equal to the session ending_timestamp. If the database vendor provides a unique session id over whole database life cycle, then the in Session function would be much simpler.

At step 1300, the starting time $T_{ts}$, the ending time $T_{te}$ and the session id sid of a user session are obtained from the User Session Tracking Table 343. At step 1310, the latest retention time $T_{rs}$ of all tables related to the user session from the Rollback Timestamp Tracking Table 341 is obtained. At step 1320, a determination is made as to whether $T_{ts}>T_{rs}$. If step 1320 has a positive result (step 1320:YES), then control transfers to step 1340. At step 1340, a table index is set to j=1.

At step 1350, a loop is begun by starting the table index at 1. For each row in the before image table $TB_j$ whose opcode=D and in Session(sid, $T_{ts}$, $T_{te}$, changing_userid, changing_timestamp)=true, a delete SQL statement is created. For each row in the before image table $TB_j$ whose opcode=U and in Session(sid, $T_{ts}$, $T_{te}$, changing_userid, changing_timestamp)=true, an update SQL statement is created using the after image of its child either in the after image table or the before image table. The parent's (changing_timestamp, changing_userid)=child's (timestamp, userid). If the after image view has a unique key, then the where clauses of the equivalent update and delete SQL statement use the unique key. Otherwise the where clause will use the full before image of all columns of the after image view.

For each parentless row in the before image table and the after image table whose in Session(sid, $T_{ts}$, $T_{te}$, userid, timestamp)=true, an insert SQL statement is created. A row is parentless if its (timestamp, userid) does exist in the before image as (changing_timestamp, changing_userid).

At step 1360, a determination is made as to whether all of the tables have been processed. If all tables have been processed (step 1360:YES), then control is transferred the control to step 1380. At this time, all equivalent SQL statements of the user session will have been reconstructed. At step 1380, the SQL statements are sorted based on the transaction timestamp. At step 1390, a final reconstruction of equivalent SQL statements of the user session report is generated and the process ends.

If it is determined at step 1360 that all tables have not been processed (step 1360:NO), then control is transferred to step 1370. At step 1370, the table index is incremented by 1. Then, control is transferred to step 1350 where the equivalent SQL statements of the user session will be reconstructed from a new table.

Returning now to step 1320, if $T_{ts}<=T_{rs}$, (step 1320:NO), control is transferred to step 1330. At step 1330, an error message is logged. Then, an error message report is generated at step 1390 and the process ends.

Figure 14A:
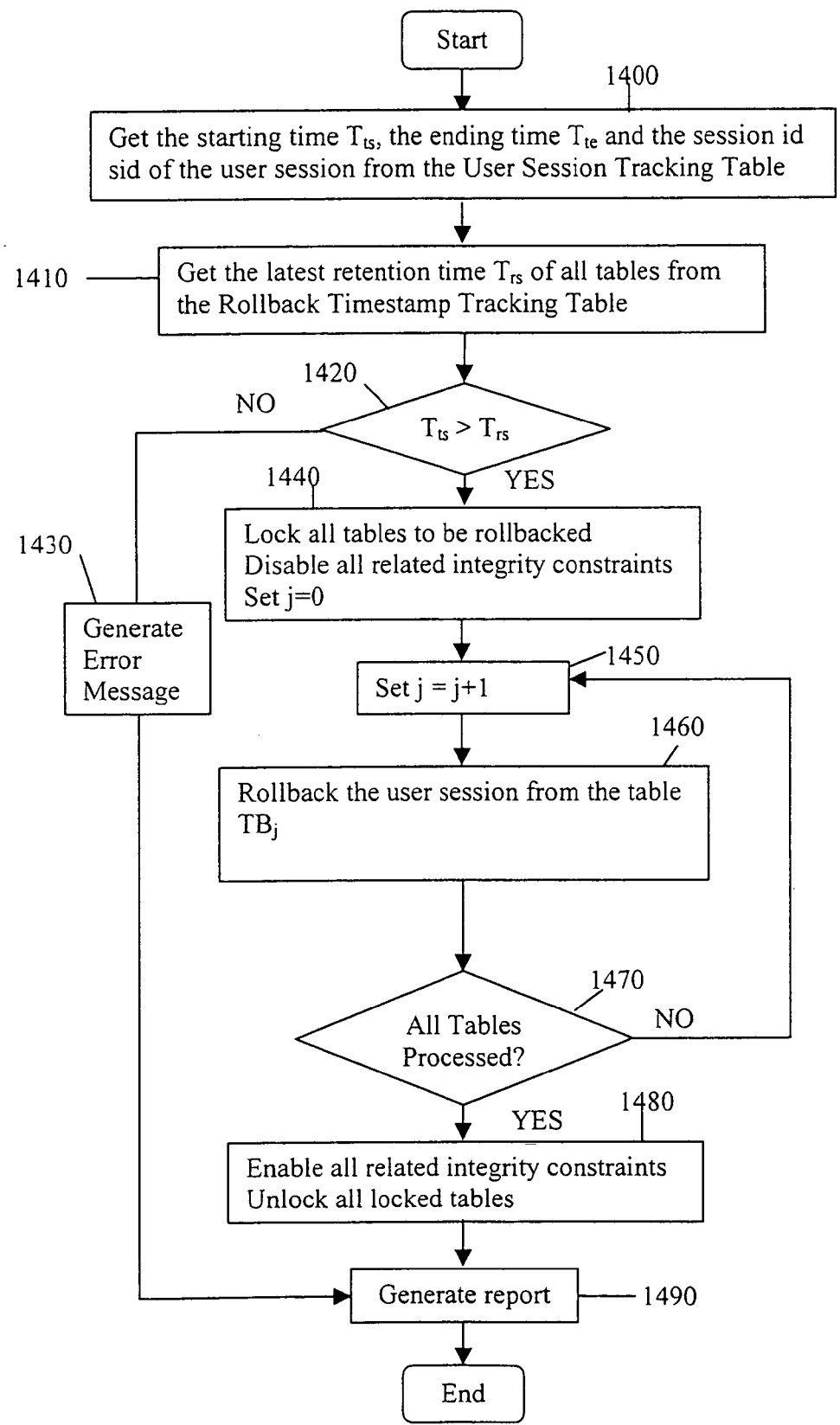
FIG. 14a is an exemplary flow diagram depicting the rollbacking of a user session in a group of tables, according to an aspect of the present invention.

FIG. 14a is an exemplary flow diagram depicting the rollbacking of a user session in a group of tables, according to an aspect of the present invention. In an exemplary embodiment, a unique session id field is included that may be provided by the database vendor or the unique session id may include the session id and the starting timestamp of the session. At step 1400, the starting time $T_{ts}$, the ending time and the session id sid of a user session are obtained from the User Session Tracking Table 343. At step 1410, the latest retention time $T_{rs}$ of all tables from the Rollback Timestamp Tracking Table 341 is obtained. At step 1420, a determination is made as to whether $T_{ts}>T_{rs}$. If step 1420 has a positive result (step 1420:YES), then control transfers to step 1440. At step 1440, all of the tables to be rollbacked are locked and all related integrity constraints are disabled. Further, a table index is set to j=0. At step 1450, a loop is begun by setting the table index to j=j+1, starting the table index at 1.

At step 1460, the user session is rollbacked from the table $TB_j$. Unlike rollbacking a new uncommitted transaction, the rollbacking of existing transactions is more complicated. For example, the data processed by the existing transactions may involve more transactions at later times. The logic of step 1460 will be discussed below with respect to FIG. 14b and FIG. 14c, under two different business rules, respectively.

At step 1470, a determination is made as to whether all of the tables have been processed. If all tables have been processed (step 1470:YES), then control is transferred the control to step 1480. At this time, all transactions in the user session will have been rollbacked. At step 1480, all related integrity constraints are enabled. If there are any errors, a SQL rollback command is issued to rollback the rollback. Also at step 1480, the tables are unlocked. At step 1490, a final user session transaction rollbacking report is generated and the process ends.

If it is determined at step 1470 that all tables have not been processed (step 1470:NO), then control is transferred to step 1450. At step 1450, the table index is incremented by 1. Then, control is transferred to step 1460 where the user session will be rollbacked from a new table.

Returning now to step 1420, if $T_{ts}<=T_{rs}$, (step 1420:NO), control is transferred to step 1430. At step 1430, an error message is logged. Then, an error message report is generated at step 1490 and the process ends.

Figure 14B:
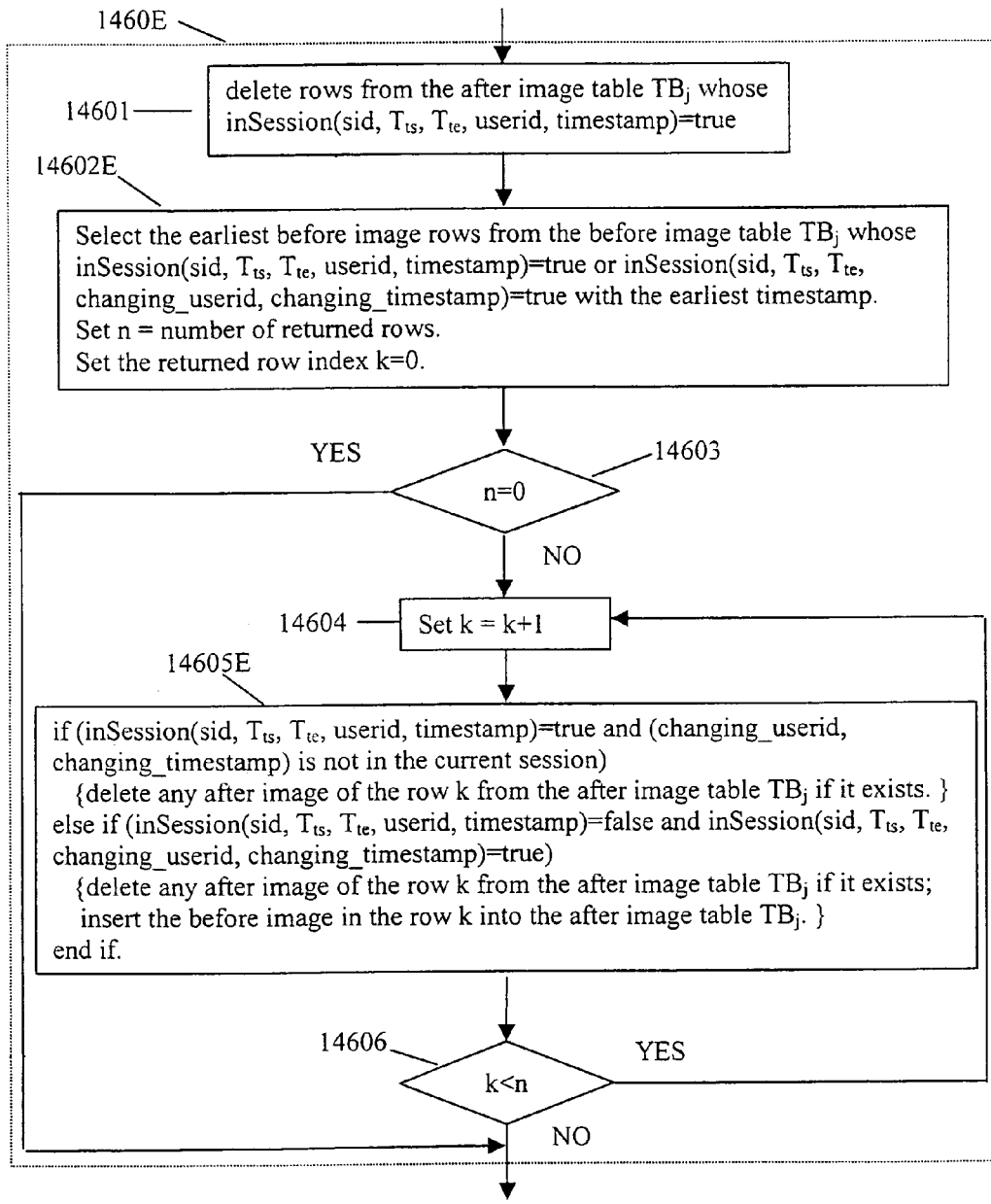
FIG. 14b is an exemplary flow diagram depicting the logic of rollbacking the user session in accordance with an earliest transaction rule, according to an aspect of the present invention.

FIG. 14b is an exemplary flow diagram depicting the logic of rollbacking the user session sid from the table $TB_j$ in accordance with the earliest transaction rule. Step 1460E is an exemplary implementation of the step 1460 in FIG. 14*a*, in accordance with the earliest transaction rule. At step 14601, rows from the after image table $TB_j$ are deleted whose in Session(sid, $T_{ts}$, $T_{te}$, userid, timestamp)=true. At step 14602E, the earliest before image row is selected from the before image table $TB_j$ whose (in Session(sid, $T_{ts}$, $T_{te}$, userid, timestamp)=true or in Session(sid, $T_{ts}$, $T_{te}$, changing_userid, changing_timestamp)=true) with the earliest timestamp. A data row may have zero, one or more transactions executed in the user session. The selected earliest before image of a data row is the oldest ancestor for the data row, in which one transaction in the user session was executed.

Referring again to step 14602E, there is no more than one before image row returned for each data row family. Also at step 14602E, n is set to the number of returned rows and a returned row index is set to k=0. At step 14603, a determination is made as to whether n=0. If n is not equal to 0 (step 14603:NO), then control is transferred to step 14604. At step 14604, a loop is begun by starting the data row index at 1, i.e., k=k+1.

At step 14605E, the transactions executed in the user session on the data row k in the table $TB_j$ are rollbacked. If the returned row k has in Session(sid, $T_{ts}$, $T_{te}$, userid, timestamp)=true and (changing_userid, changing_timestamp) is not in the current session, any after image of the row k from the after image table $TB_j$ is deleted, if it exists. If the returned row k has in Session(sid, $T_{ts}$, $T_{te}$, userid, timestamp)=false and in Session(sid, $T_{ts}$, $T_{te}$, changing_userid, changing_timestamp)=true, any after image of the row k is deleted from the after image table $TB_j$, if it exists. Also, the returned before image of the row k is inserted into the after image table $TB_j$.

At step 14606, a determination is made as to whether all returned rows have been processed. If all of the returned rows have been processed (k>=n), then control is transferred to step 1470 in FIG. 14*a*. Otherwise, if k<n, then control is transferred to step 14604. At step 14604, the row index k is incremented by 1. Then, the transactions executed in the user session will be rollbacked on a new data row. If n=0 at step 14603, then control is transferred to step 1470 in FIG. 14*a*.

Figure 14C:
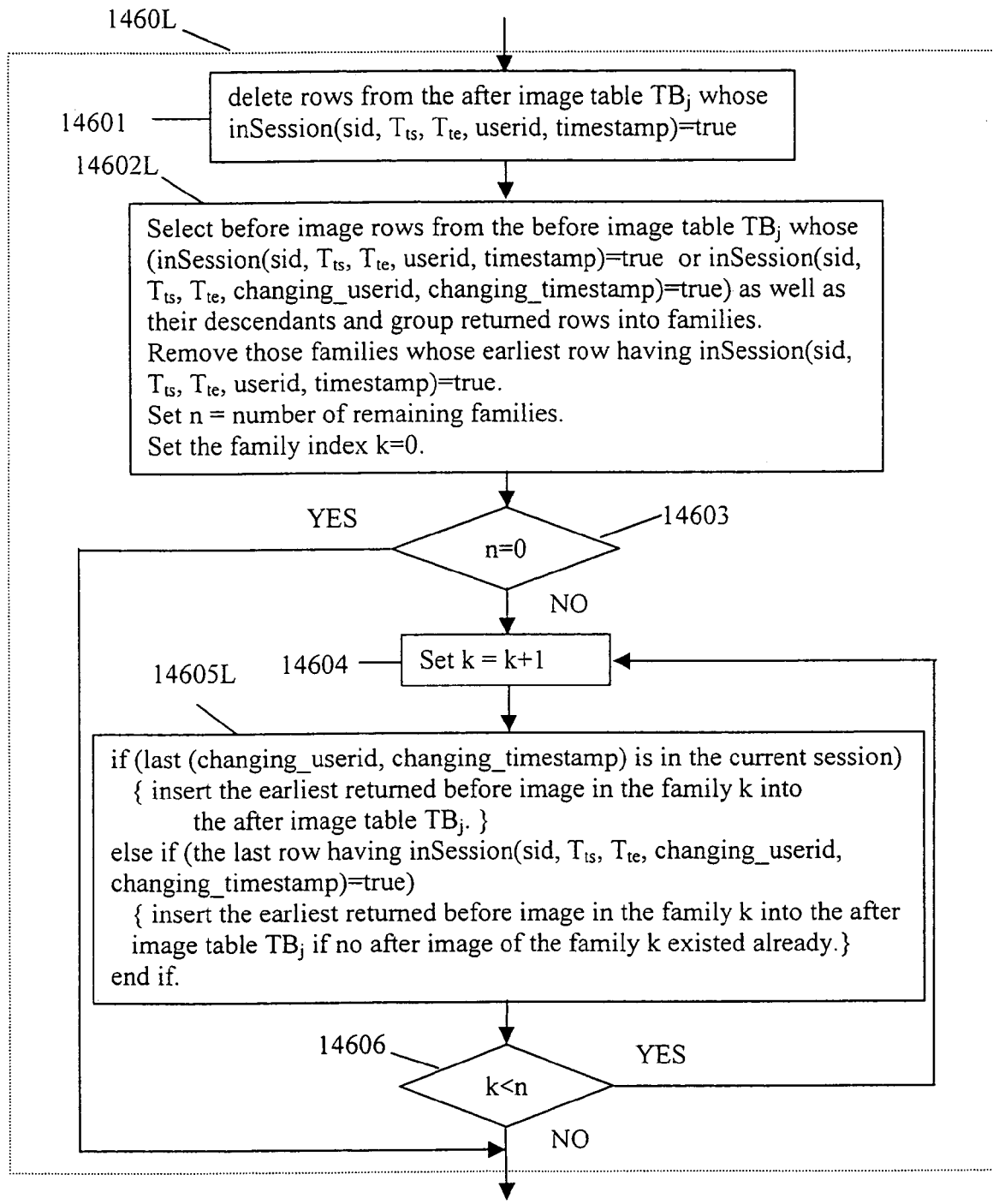
FIG. 14c is an exemplary flow diagram depicting the logic of rollbacking the user session in accordance with a last transaction rule, according to an aspect of the present invention.

FIG. 14*c* is an exemplary flow diagram depicting the logic of rollbacking the user session from the table $TB_j$ in accordance with the last transaction rule. Step 1460L is an exemplary implementation of the step 1460 in FIG. 14*a*, in accordance with the last transaction rule. At step 14601, rows are deleted from the after image table $TB_j$ whose in Session(sid, $T_{ts}$, $T_{te}$, userid, timestamp)=true.

At step 14602L, before image rows from the before image table $TB_j$ are selected whose in Session(sid, $T_{ts}$, $T_{te}$, userid, timestamp)=true or in Session(sid, $T_{ts}$, $T_{te}$, changing_userid, changing_timestamp)=true as well as their descendants and group returned rows into families. Further, those families are removed whose earliest transaction has in Session(sid, $T_{ts}$, $T_{te}$, userid, timestamp)=true. Also, n is set to the number of remaining families and a returned family index is set to k=0. If n is not equal to 0 (step 14603:NO), then control is transferred to step 14604. At step 14604, a loop is begun by starting the data row family index to 1, i.e., k=k+1.

At step 14605L, the transactions executed in the user session are rollbacked on the data row family k in the table $TB_j$. If the last transaction is executed in the current session, the earliest returned before image in the family k is inserted into the after image table $TB_j$. If the last transaction has in Session(sid, $T_{ts}$, $T_{te}$, changing_userid, changing_timestamp)=true and no after image of the family k exists in the after image table $TB_j$, the earliest returned before image in the family k is inserted into the after image table $TB_j$.

At step 14606, a determination is made as to whether all returned data row families have been processed. If all of the returned data row families have been processed (k>=n), then control is transferred to step 1470 in FIG. 14*a*. Otherwise, if k<n, then control is transferred to step 14604. At step 14604, the data row family index k is incremented by 1. Then, the transaction executed in the user session will be rollbacked on a new data row family. If n=0 at step 14603, then control is transferred to step 1470 in FIG. 14*a*.

Thus, an online method is provided for efficiently identifying the scope and timeframe of database errors, providing online history images, reconstructing the equivalent SQL statements of a committed transaction id set, reconstructing the equivalent SQL statements of a user session, providing a selective audit trail report on demand, and permitting selective online rollbacks in an application database. The rollback can be done on a single row, a single transaction, a group transactions, a user session, and/or on all user tables.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on one or more computer processors. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and includes art-recognized equivalents and successor media, in which the software implementations are stored.

Although the present specification describes components and functions implemented in the embodiments with reference to particular standards and protocols, the invention is not limited to such standards and protocols. For instance, such standards are periodically superceded by faster or more efficient equivalents having essentially the same functions.

Accordingly, replacement standards and protocols having the same functions are considered equivalents.

What is claimed is:

1. A method of rollbacking a transaction id set in a plurality of tables of an active database, each of the plurality of tables having a before image table and an after image table, the method comprising:

retrieving an earliest starting time of the transaction id set;

retrieving a latest retention time for each of the plurality of tables;

determining that the earliest starting time is greater than the latest retention time;

locking each of the plurality of tables to be rollbacked and disabling associated referential integrity constraints;

deleting rows from each of the after image tables having an after image table transaction id that is a member of the transaction id set;

selecting earliest before image rows from each of the before image tables having a before image table transaction id that is a proper subset of the transaction id set, or having a changing transaction id that is a proper subset of the transaction id set, and having an earliest timestamp;

deleting any after image of a row from each of the after image tables when the after image table transaction id of the row is a proper subset of the transaction id set and a changing transaction id of the row is not equal to a current transaction id;

deleting any after image of a row from each of the after image tables and inserting the earliest before image from the row into each of the after image tables when a transaction id of the row is not a proper subset of the transaction id set and the changing transaction id is a proper subset of the transaction id set; and activating the associated referential integrity constraints.

2. A method of rollbacking a transaction id set in a plurality of tables of an active database, each of the plurality of tables having a before image table and an after image table, the method comprising:

retrieving an earliest starting time of the transaction id set;

retrieving a latest retention time for each of the plurality of tables;

determining that the earliest starting time is greater than the latest retention time;

locking each of the plurality of tables to be rollbacked and disabling associated referential integrity constraints;

deleting rows from each of the after image tables having an after image table transaction id that is a member of the transaction id set;

selecting before image rows and any descendants thereof from each of the before image tables having a before image table transaction id that is a proper subset of the transaction id set or having a changing transaction id that is a proper subset of the transaction id set;

grouping the selected before image rows into families;

removing any of the families having an earliest transaction id that is a proper subset of the transaction id set;

inserting an earliest returned before image in a family into each of the after image tables when the last changing transaction id of the family is equal to a current transaction id;

inserting an earliest returned before image in a family into each of the after image tables when the last changing transaction id of the family is a proper subset of the transaction id set and if no after image of the family exist; and activating the associated referential integrity constraints.

3. A method of rollbacking transactions made in a user session in a plurality of tables of an active database, each of the plurality of tables having a before image table and an after image table, the method comprising:

retrieving each of a starting time, an ending time, and a unigue session id of the user session;

retrieving a latest retention time for each of the plurality of tables;

determining that the starting time is greater than the latest retention time of each of the plurality of tables;

locking each of the plurality of tables to be rollbacked and disabling associated integrity constraints;

deleting rows from each of the after image tables having a unique session id that is equal to the user session's unique session id;

selecting before image rows, having an earliest timestamp, from each of the before image tables having a unique session id that is equal to the unique session id of the user session, or having a changing unique session id that is equal to the user session's unique session id;

deleting any after image of a row from each of the after image tables when a unique session id of the row is equal to the user session's unique session id and a changing unique session id of the row is not equal to a current session's unique session id;

deleting any after image of a row from each of the after image tables and inserting a before image from the row into each of the after image tables if the unique session id of the row is not equal to the user session's unique session id set and the changing unique session id is equal to the user session's unique session id; and activating the associated integrity constraints.

4. The method according to claim 3, wherein the unique session id comprises a session id and a starting timestamp of the session.

5. The method according to claim 3, wherein the unique session id comprises a unique identifier of the session provided by a database vendor.

6. A method of rollbacking transactions made in a user session in a plurality of tables of an active database, each of the plurality of tables having a before image table and an after image table, the method comprising:

retrieving each of a starting time, an ending time, and a unigue session id of the user session;

retrieving a latest retention time for each of the plurality of tables;

determining that the starting time is greater than the latest retention time of each of the plurality of tables;

locking each of the plurality of tables to be rollbacked and disabling associated integrity constraints;

deleting rows from each of the after image tables whose unique session id is equal to the unique session id of the user session;

selecting before image rows and any descendants thereof from each of the before image tables whose unique session id is equal to the unique session id of the user session or having a changing unique session id that is equal to the unique session id of the user session;

grouping the selected rows into families;

removing any families having an earliest unique session id that is equal to the unique session id of the user session;

inserting an earliest returned before image in a family into each of the after image tables when a last changing unique session id of the family is equal to a unique session id of a current session;

inserting an earliest returned before image in a family into each of the after image tables when the last changing unique session id of the family is equal to a unique session id of the user session and if no after image of the family exists; and activating the associated integrity constraints.

7. The method according to claim 6, wherein the unique session id comprises a unique identifier of the session provided by a database vendor.

8. The method according to claim 6, wherein the unique session id comprises a session id and a starting timestamp of the session.

* * * * *

UNITED STATES PATENT AND TRADEMARK OFFICE
CERTIFICATE OF CORRECTION

PATENT NO.         : 7,281,023 B2
APPLICATION NO. : 10/734112
DATED                 : October 9, 2007
INVENTOR(S)       : Yongming Lou It is certified that error appears in the above-identified patent and that said Letters Patent is hereby corrected as shown below:

On the Title page of the printed patent, under Other Publications please insert the following reference: --Oracel9i Application Developer's Guide – Fundamentals, Release 2 (9.2) March 2002--.

At column 26, line 6 (claim 3, line 6), of the printed patent, please change "unigue" to --unique--.

At column 26, line 46 (claim 6, line 6), of the printed patent, please change "unigue" to --unique--.

Signed and Sealed this

Seventeenth Day of June, 2008

JON W. DUDAS
*Director of the United States Patent and Trademark Office*